US007560160B2

(12) United States Patent  (10) Patent No.: US 7,560,160 B2
Sudarshan et al.  (45) Date of Patent: Jul. 14, 2009

(54) MULTIFUNCTIONAL PARTICULATE MATERIAL, FLUID, AND COMPOSITION

(75) Inventors: Tirumalai S. Sudarshan, Vienna, VA (US); Sanjay Kotha, Falls Church, VA (US); Ramachandran Radhakrishnan, Falls Church, VA (US)

(73) Assignee: Materials Modification, Inc., Fairfax, VA (US)

( * ) Notice: Subject to any disclaimer, the term of this patent is extended or adjusted under 35 U.S.C. 154(b) by 0 days.

(21) Appl. No.: 10/302,962

(22) Filed: Nov. 25, 2002

(65) Prior Publication Data

US 2004/0105980 A1 Jun. 3, 2004

(51) Int. Cl.
B32B 5/66 (2006.01)
(52) U.S. Cl. .................. 428/402; 428/403; 428/404; 428/405; 428/406; 428/407
(58) Field of Classification Search .......... 428/402–407
See application file for complete search history.

(56) References Cited

U.S. PATENT DOCUMENTS

| | | | |
|---|---|---|---|
| 3,047,507 A | 7/1962 | Winslow | |
| 3,127,528 A | 3/1964 | Lary et al. | |
| 3,287,677 A | 11/1966 | Mohr | |
| 3,488,531 A | 1/1970 | Rosenswelg | |
| 3,560,378 A * | 2/1971 | Weiss et al. | 210/680 |
| 3,767,783 A * | 10/1973 | Lung et al. | 424/406 |
| 3,927,329 A | 12/1975 | Fawcett et al. | |
| 3,937,839 A | 2/1976 | Strike et al. | |
| 4,064,409 A | 12/1977 | Redman | |
| 4,106,488 A | 8/1978 | Gordon | |
| 4,107,288 A | 8/1978 | Oppenheim et al. | |
| 4,183,156 A | 1/1980 | Rudy | |
| 4,219,945 A | 9/1980 | Rudy | |
| 4,267,234 A | 5/1981 | Rembaum | |
| 4,268,413 A | 5/1981 | Dabisch | |
| 4,303,636 A | 12/1981 | Gordon | |
| 4,321,020 A | 3/1982 | Mittal | |
| 4,323,056 A | 4/1982 | Borrelli et al. | |
| 4,340,626 A | 7/1982 | Rudy | |
| 4,342,157 A | 8/1982 | Gilbert | |
| 4,364,377 A | 12/1982 | Smith | |
| 4,443,430 A | 4/1984 | Mattei et al. | |
| 4,452,773 A | 6/1984 | Molday | |
| 4,454,234 A | 6/1984 | Czerlinski | |
| 4,472,890 A | 9/1984 | Gilbert | |
| 4,501,726 A | 2/1985 | Schröder et al. | |
| 4,545,368 A | 10/1985 | Rand et al. | |
| 4,554,088 A | 11/1985 | Whitehead et al. | |
| 4,574,782 A | 3/1986 | Borrelli et al. | |
| 4,613,304 A | 9/1986 | Meyer | |
| 4,628,037 A | 12/1986 | Chagnon et al. | |
| 4,637,394 A | 1/1987 | Racz et al. | |
| 4,662,359 A | 5/1987 | Gordon | |
| 4,672,040 A | 6/1987 | Josephson | |
| 4,695,392 A | 9/1987 | Whitehead et al. | |
| 4,695,393 A | 9/1987 | Whitehead et al. |
| 4,721,618 A | 1/1988 | Giles et al. |
| 4,770,183 A | 9/1988 | Groman et al. |
| 4,834,898 A | 5/1989 | Hwang |
| 4,951,675 A | 8/1990 | Groman et al. |
| 4,992,190 A | 2/1991 | Shtarkman |
| 4,999,188 A | 3/1991 | Solodovnik et al. |
| 5,067,952 A | 11/1991 | Gudov et al. |
| 5,069,216 A | 12/1991 | Groman et al. |
| 5,079,786 A | 1/1992 | Rojas |
| 5,108,359 A | 4/1992 | Granov et al. |
| 5,161,776 A | 11/1992 | Nicholson |
| 5,178,947 A | 1/1993 | Charmot et al. |
| 5,180,583 A | 1/1993 | Hedner |
| 5,202,352 A | 4/1993 | Okada et al. |
| 5,207,675 A | 5/1993 | Canady |
| 5,236,410 A | 8/1993 | Granov et al. |
| 5,348,050 A | 9/1994 | Ashton |
| 5,354,488 A | 10/1994 | Shtarkman et al. |
| 5,358,659 A | 10/1994 | Ziolo |
| 5,374,246 A | 12/1994 | Ray |
| 5,427,767 A | 6/1995 | Kresse et al. |
| 5,466,609 A | 11/1995 | Siiman et al. |
| 5,493,792 A | 2/1996 | Bates et al. |
| 5,507,744 A | 4/1996 | Tay et al. |
| 5,525,249 A | 6/1996 | Kordonsky et al. |
| 5,549,837 A | 8/1996 | Ginder et al. |
| 5,565,215 A | 10/1996 | Gref et al. |
| 5,582,425 A | 12/1996 | Skanberg et al. |
| 5,595,735 A | 1/1997 | Saferstein et al. |
| 5,597,531 A | 1/1997 | Liberti et al. |
| 5,599,474 A | 2/1997 | Weiss et al. |
| 5,624,685 A | 4/1997 | Takahashi et al. |
| 5,635,162 A | 6/1997 | Fischer |
| 5,635,215 A | 6/1997 | Boschetti et al. |
| 5,645,849 A | 7/1997 | Pruss et al. |
| 5,646,185 A | 7/1997 | Giaccia et al. |
| 5,650,681 A | 7/1997 | DeLerno |
| 5,667,715 A | 9/1997 | Foister |
| 5,670,078 A | 9/1997 | Ziolo |
| 5,673,721 A | 10/1997 | Alcocer |

(Continued)

FOREIGN PATENT DOCUMENTS

CA 2328826 A1 3/2001

(Continued)

OTHER PUBLICATIONS

Australian Patent Office Examiner's Report dated May 17, 2007 (2 pages).

(Continued)

*Primary Examiner*—Leszek Kiliman
(74) *Attorney, Agent, or Firm*—Dinesh Agarwal, P.C.

(57) ABSTRACT

A multifunctional particulate material, fluid, or composition includes a predetermined amount of core particles with a plurality of coatings. The core particles have an average particle size of about 1 nm to 500 μm. The particulate material, fluid, or composition is capable of exhibiting one or more properties, such as magnetic, thermal, optical, electrical, biological, chemical, lubrication, and rheological.

61 Claims, 15 Drawing Sheets

U.S. PATENT DOCUMENTS

| | | | |
|---|---|---|---|
| 5,695,480 | A | 12/1997 | Evans et al. |
| 5,702,630 | A | 12/1997 | Sasaki et al. |
| 5,707,078 | A | 1/1998 | Swanberg et al. |
| 5,707,877 | A | 1/1998 | Siiman et al. |
| 5,714,829 | A | 2/1998 | Guruprasad |
| 5,782,954 | A | 7/1998 | Luk |
| 5,800,372 | A | 9/1998 | Bell et al. |
| 5,813,142 | A | 9/1998 | Demon |
| 5,900,184 | A | 5/1999 | Weiss et al. |
| 5,919,490 | A | 7/1999 | Zastrow et al. |
| 5,927,753 | A | 7/1999 | Faigle et al. |
| 5,947,514 | A | 9/1999 | Keller et al. |
| 5,958,794 | A | 9/1999 | Bruxvoort et al. |
| 5,993,358 | A | 11/1999 | Gureghian et al. |
| 6,013,531 | A * | 1/2000 | Wang et al. ............... 436/526 |
| 6,027,664 | A | 2/2000 | Weiss et al. |
| 6,036,226 | A | 3/2000 | Brown et al. |
| 6,036,955 | A | 3/2000 | Thorpe et al. |
| 6,039,347 | A | 3/2000 | Maynard |
| 6,044,866 | A | 4/2000 | Rohrbeck |
| 6,051,607 | A | 4/2000 | Greff |
| 6,076,852 | A | 6/2000 | Faigle |
| 6,083,680 | A | 7/2000 | Ito et al. |
| 6,096,021 | A | 8/2000 | Helm et al. |
| 6,136,428 | A * | 10/2000 | Truong et al. ............... 428/323 |
| 6,149,576 | A | 11/2000 | Gray et al. |
| 6,149,832 | A | 11/2000 | Foister |
| 6,167,313 | A | 12/2000 | Gray et al. |
| 6,186,176 | B1 | 2/2001 | Gelbmann |
| 6,189,538 | B1 | 2/2001 | Thorpe |
| 6,207,178 | B1 | 3/2001 | Westesen et al. |
| 6,225,705 | B1 | 5/2001 | Nakamats |
| 6,266,897 | B1 | 7/2001 | Seydel et al. |
| 6,274,121 | B1 | 8/2001 | Pilgrimm |
| 6,299,619 | B1 | 10/2001 | Greene, Jr. et al. |
| 6,312,484 | B1 | 11/2001 | Chou et al. |
| 6,315,709 | B1 | 11/2001 | Garibaldi et al. |
| 6,319,599 | B1 | 11/2001 | Buckley |
| 6,335,384 | B1 | 1/2002 | Evans et al. |
| 6,355,275 | B1 | 3/2002 | Klein |
| 6,358,196 | B1 | 3/2002 | Rayman |
| 6,364,823 | B1 | 4/2002 | Garibaldi et al. |
| 6,391,343 | B1 | 5/2002 | Yen |
| 6,399,317 | B1 | 6/2002 | Weimer |
| 6,409,851 | B1 | 6/2002 | Sethuram et al. |
| 6,443,993 | B1 | 9/2002 | Koniuk |
| 6,468,730 | B2 | 10/2002 | Fujiwara et al. |
| 6,475,710 | B2 | 11/2002 | Kudo et al. |
| 6,481,357 | B1 | 11/2002 | Lindner et al. |
| 6,489,694 | B1 | 12/2002 | Chass |
| 6,527,972 | B1 | 3/2003 | Fuchs et al. |
| 6,530,944 | B2 * | 3/2003 | West et al. ............... 607/88 |
| 6,548,264 | B1 | 4/2003 | Tan et al. |
| 6,557,272 | B2 | 5/2003 | Pavone |
| 6,582,429 | B2 | 6/2003 | Krishnan et al. |
| 6,663,673 | B2 | 12/2003 | Christensen |
| 6,666,991 | B1 * | 12/2003 | Atarashi et al. ........ 252/301.4 R |
| 6,683,333 | B2 | 1/2004 | Kazlas et al. |
| 6,734,574 | B2 | 5/2004 | Shin |
| 6,768,230 | B2 | 7/2004 | Cheung et al. |
| 6,789,820 | B2 | 9/2004 | Meduvsky et al. |
| 6,815,063 | B1 | 11/2004 | Mayes |
| 6,871,871 | B2 | 3/2005 | Parizat et al. |
| 6,982,501 | B1 | 1/2006 | Kotha et al. |
| 7,007,972 | B1 | 3/2006 | Radhakrishnan et al. |
| 7,101,862 | B2 | 9/2006 | Cochrum et al. |
| 7,200,956 | B1 | 4/2007 | Kotha et al. |
| 7,249,604 | B1 | 7/2007 | Mohanraj |
| 2001/0011810 | A1 | 8/2001 | Saiguchi et al. |
| 2001/0016210 | A1 | 8/2001 | Mathiowitz et al. |
| 2001/0033384 | A1 | 10/2001 | Luo et al. |
| 2002/0045045 | A1 | 4/2002 | Adams et al. |
| 2002/0164474 | A1 | 11/2002 | Buckley |
| 2003/0009910 | A1 | 1/2003 | Pavone |
| 2003/0216815 | A1 | 11/2003 | Christensen |
| 2004/0002665 | A1 | 1/2004 | Parihar et al. |
| 2004/0022849 | A1 * | 2/2004 | Castan et al. ............... 424/468 |
| 2004/0051283 | A1 | 3/2004 | Parizat et al. |
| 2004/0132562 | A1 | 7/2004 | Schwenger et al. |
| 2004/0154190 | A1 | 8/2004 | Munster |

FOREIGN PATENT DOCUMENTS

| | | |
|---|---|---|
| DE | 37 38 989 A1 | 5/1989 |
| DE | 10240530 | 3/2004 |
| WO | WO 99/53901 | 10/1999 |

OTHER PUBLICATIONS

Derwent Abstract Accession No. 92-223333/27, JP 04149025 A (Toshiba Glass KK) May 22, 1992.

Remington: The Science and Practice of Pharmacy; vol. II, pp. 1524-1528 (1995).

Zahn, M. "Magnetic Fluid and Nanoparticle Applications to Nanotechnology", Journal of Nanoparticle Research 3, pp. 73-78, 2001.

U.S. Appl. No. 10/157,921, filed May 31, 2002.

PCT Serial No. PCT/US03/14545—Filed: May 28, 2003.

PCT Serial No. PCT/US03/16230—Filed: Jun. 25, 2003.

Lubbe, AS et al. "Clinical experiences with magnetic drug targeting: a phase I study with 4'—expidoxorubicin in 14 patients with advanced solid tumors", Cancer Research, vol. 56, Issue 20, 4686-4693 (Abstract) (1996).

Sako, M et al., "Embolotherapy of hepatomas using ferromagnetic microspheres, its clinical evaluation and the prospect of its use as a vehicle in chemoembolo-hyperthermic therapy", Gan to kagaku ryoho. Cancer & chemotherapy, vol. 13, No. 4, Pt. 2, 1618-1624 (Abstract) (1986).

Azuma, Y. et al. "Coating of ferric oxide particles with silica by hydrolysis of TEOS", Journal of the Ceramic Society of Japan, 100(5), 646-51 (May 1992).

Atarashi, T. et al. "Synthesis of ethylene-glycol-based magnetic fluid using silica-coated iron particle", Journal of Magnetism and Magnetic Materials, 201, 7-10 (1999).

Homola, A. M. et al., "Novel Magnetic Dispersions Using Silica Stabilized Particles", IEEE Transactions on Magnetics, 22 (5), 716-719 (Sep. 1986).

Giri, A. et al. "AC Magnetic Properties of Compacted FeCo Nanocomposites", Mater. Phys. and Mechanics, 1, 1-10 (2000).

Zhou et al., Nanostructures of gold coated iron core-shell nanoparticles and the nanobands assembled under magnetic field. Eur. Phys. J.D. 16, (2001) (Abstract Only).

Alam H.B., Chen Z., Jaskille A., Querol R. I. L.C., Koustova E., Incencio R., Conran R., Seufert A., Ariaban N., Toruno K., and Rhee P. Application of a Zeolite Hemostatic Agent Achieves 100% Survival in a Lethal Model of Complex Groin Injury in Swine. J. Trauma. May 2004;56:974-983.

Holcomb J.B., McClain, Pusateri A.E., Beall D., Macaitis J.M., Harris R.A., MacPhee M.J., and Hess J.R. Fibrin Sealant Foam Sprayed Directly on Liver Injuries Decreases Blood Loss in Resuscitated Rats. J. Trauma Aug. 2000;49:246-250.

Ellis-Behnke R.G., Liang, Y.X., Tay D.K.C., Kau P.W.F., Schneider, G.E., Zhang S., Wu W., and So K.F. Nano hemostat solution: immediate hemostasis at the nanoscale. Nanomedicine: Nanotechnology, Biology, and Medicine 2 (2006) 207-215.

Office Action dated Oct. 10, 2003, issued in co-pending U.S. Appl. No. 10/681,899, filed Oct. 10, 2003.

Office Action dated Jan. 3, 2008, issued in co-pending U.S. Appl. No. 10/681,899, filed Oct. 10, 2003.

Office Action dated Dec. 9, 2004, issued in co-pending U.S. Appl. No. 10/157,921, filed May 31, 2002.

Office Action dated Oct. 11, 2005, issued in co-pending U.S. Appl. No. 10/157,921, filed May 31, 2002.

Office Action dated Jul. 6, 2006, issued in co-pending U.S. Appl. No. 10/157,921, filed May 31, 2002.
Office Action dated Jun. 14, 2007, issued in co-pending U.S. Appl. No. 10/157,921, filed May 31, 2002.

Co-pending U.S. Appl. No. 10/681,899, filed Oct. 10, 2003 (submitted to PTO on Nov. 3, 2003).

* cited by examiner

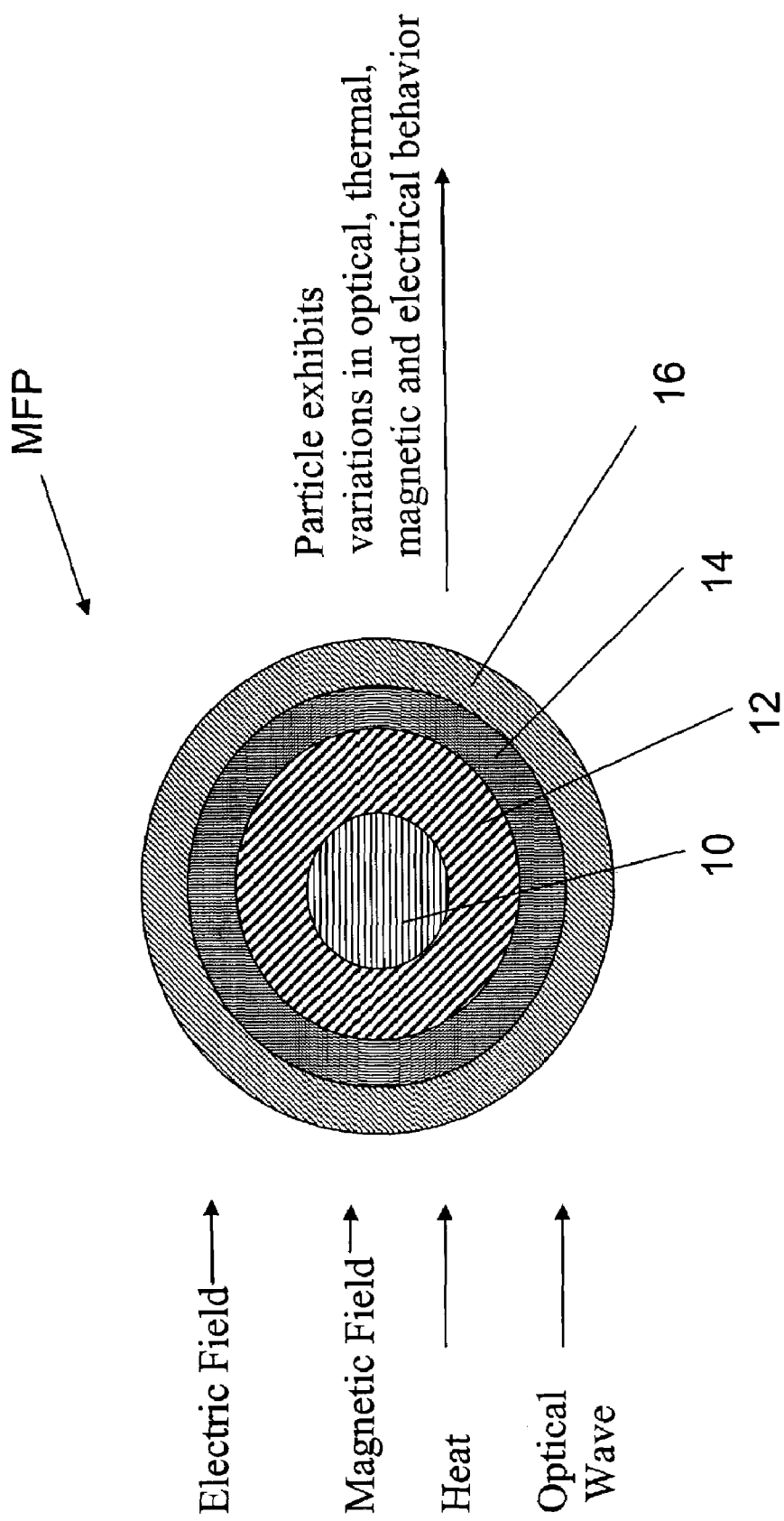

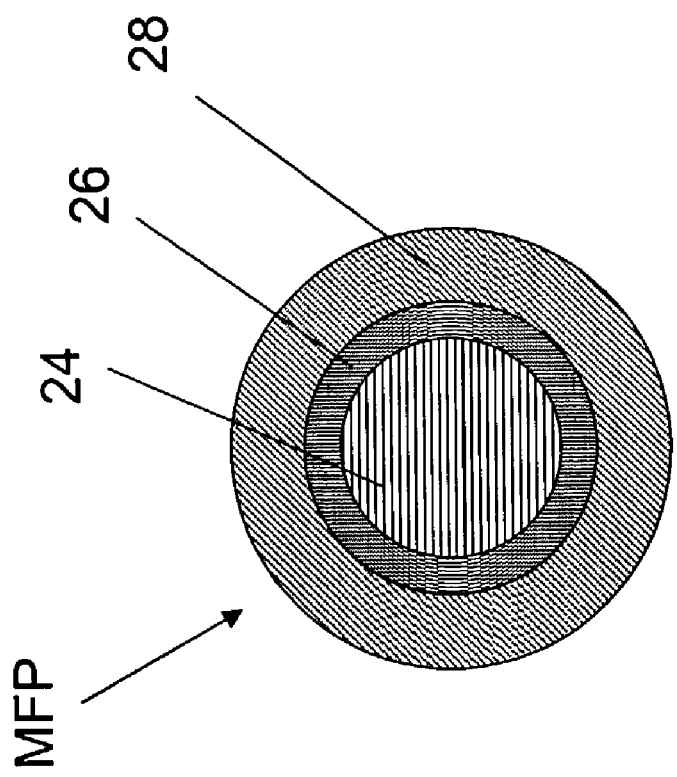
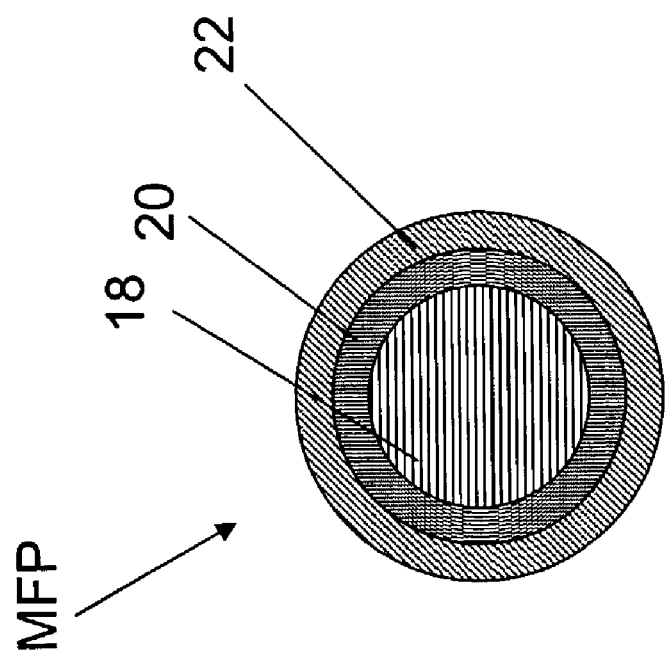

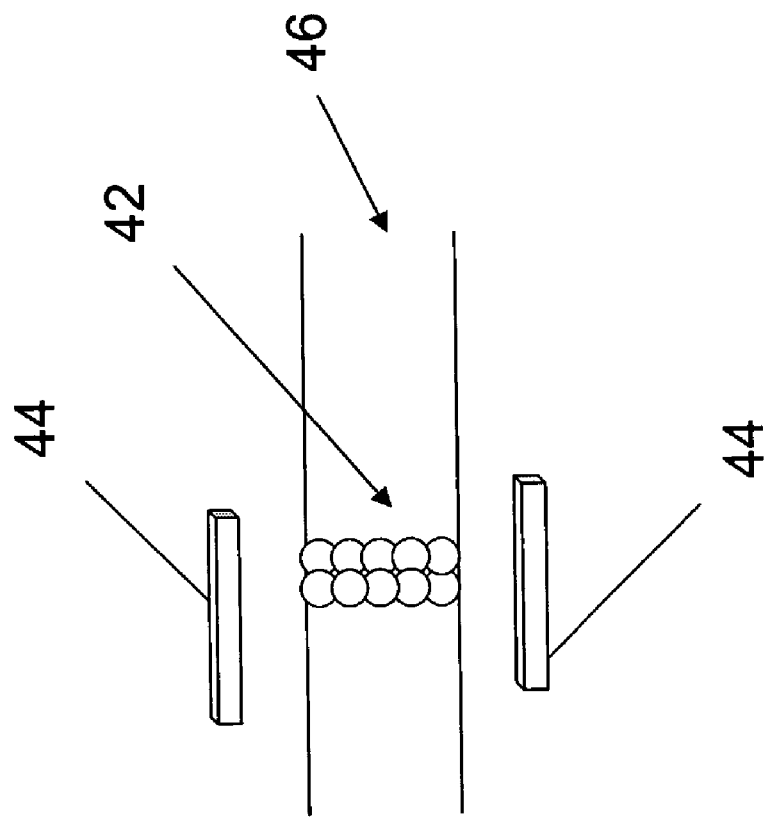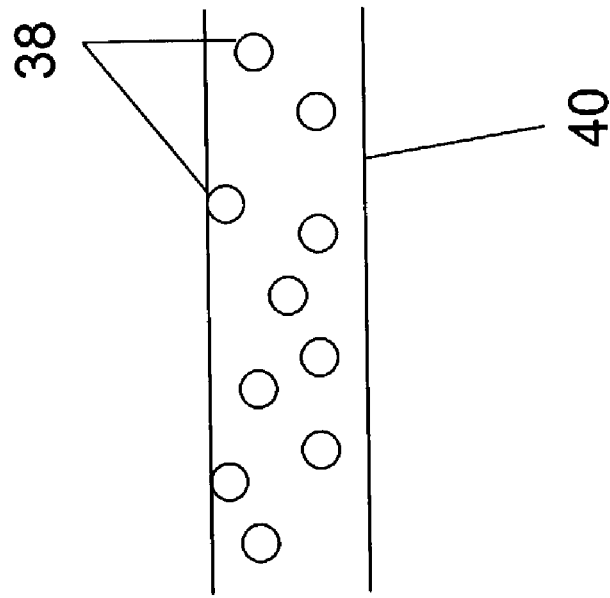
FIG. 9

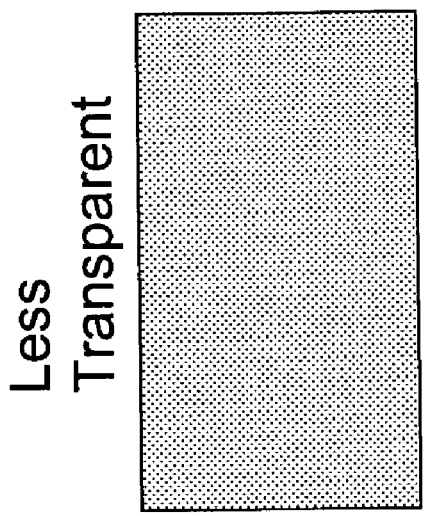
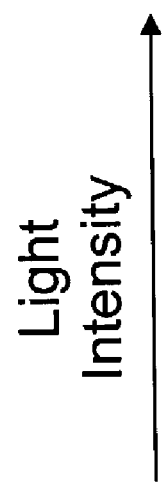
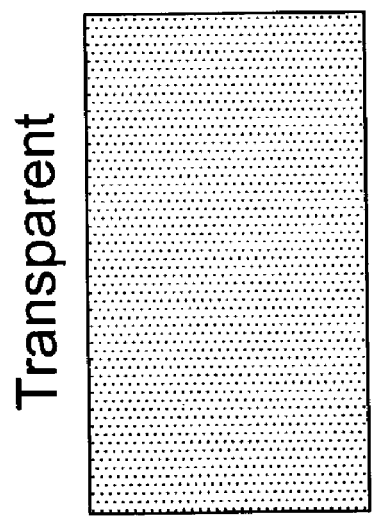
FIG. 11

MULTIFUNCTIONAL PARTICULATE MATERIAL, FLUID, AND COMPOSITION

CROSS-REFERENCE TO RELATED APPLICATIONS

The present application is related to pending U.S. application Ser. No. 10/157,921, filed May 31, 2002, and which is incorporated herein in its entirety by reference.

BACKGROUND OF THE INVENTION

The present invention is generally directed to a particulate material, and more particularly to a multifunctional particulate material, composition, and fluid capable of exhibiting one or more properties, such as magnetic, thermal, optical, electrical, biological, lubrication and rheological.

Dispersions of particles in fluids, termed as functional fluids, exhibit controllable property changes with an application of either one or a combination of electrical, thermal, optical or magnetic impulses. The prominent examples from the art, include thermal heat transfer fluids, magnetorheological (MR) fluids and electrorheological (ER) fluids. ER and MR fluids are known to exhibit changes in rheological behavior in the presence of an electrical and magnetic field, respectively, making them useful in a wide spectrum of applications, such as brakes, clutches, dampers and many others. However, if these fluids could exhibit more than one functionality, their performance and life would increase many-folds. For example, if MR fluids, in addition to Theological control, have a thermal tunablity, the life of the device, which is adversely affected by the dissipated heat, can be significantly increased. Such multifunctional fluids are not known to exist presently.

Various examples of prior art in this area include U.S. Pat. Nos. 3,047,507; 3,937,839; 4,064,409; 4,106,488; 4,107,288; 4,183,156; 4,219,945; 4,267,234; 4,268,413; 4,303,636; 4,323,056; 4,340,626; 4,342,157; 4,443,430; 4,452,773; 4,454,234; 4,472,890; 4,501,726; 4,545,368; 4,554,088; 4,574,782; 4,613,304; 4,628,037; 4,637,394; 4,662,359; 4,672,040; 4,695,392; 4,695,393; 4,721,618; 4,992,190; 4,999,188; 5,067,952; 5,108,359; 5,161,776; 5,180,583; 5,202,352; 5,207,675; 5,236,410; 5,354,488; 5,358,659; 5,374,246; 5,427,767; 5,466,609; 5,493,792; 5,507,744; 5,525,249; 5,565,215; 5,582,425; 5,595,735; 5,597,531; 5,624,685; 5,635,162; 5,635,215; 5,645,849; 5,646,185; 5,667,715; 5,670,078; 5,695,480; 5,702,630; 5,707,078; 5,714,829; 5,782,954; 5,800,372; 5,900,184; 5,927,753; 5,947,514; 6,027,664; 6,036,226; 6,036,955; 6,039,347; 6,044,866; 6,051,607; 6,076,852; 6,096,021; 6,149,576; 6,149,832; 6,167,313; 6,186,176 B1; 6,189,538 B1; 6,266, 897 B1; 6,274,121 B1; 6,299,619 B1; 6,315,709 B1; 6,335, 384 B1; 6,355,275 B1; 6,399,317 B1 6,409,851 B1; US 2001/ 0016210 A1; US 2001/0033384 and US 2002/0045045 A1; and.

OBJECTS AND SUMMARY OF THE INVENTION

The principal object of the present invention is to provide a particulate material that is capable of exhibiting multifunctional properties.

An object of the present invention is to provide a particulate composition that is capable of exhibiting multifunctional properties.

Another object of the present invention is to provide a fluid that is capable of exhibiting multifunctional properties. In particular, a fluid in accordance with the present invention is capable of exhibiting one or more properties, such as magnetic, thermal, optical, electrical, biological, chemical, lubrication, Theological, etc.

An additional object of the present invention is to provide a fluid that is sensitive to one or more stimuli or fields, such as magnetic, thermal, optical, electrical, etc.

Yet an additional object of the present invention is to provide a particulate material, a composition, a fluid, and/or an article including one or more of the same, which is capable of exhibiting substantially simultaneous variations in one or more of its properties when subjected to one or more stimuli, such as magnetic, thermal, optical, electrical, etc.

Still yet an additional object of the present invention is to provide a particulate material, a composition, a fluid, and/or an article including one or more of the same, wherein multifunctional properties are preferably derived from the core particles, one or more coatings, and the carrier medium.

In summary, the main object of the present invention is to provide a fluid which includes single or multilayered coated particles of one or more compositions in a suitable carrier medium. The particles, coatings and the carrier medium, preferably include non-interacting compositions. The fluid exhibits a novel multifunctional behavior. A fluid possesses multifunctionality when it exhibits two or more properties. A wide variety of processes are adopted to (1) synthesize the particles in various sizes (about 1 nm to 500 µm), shapes (spherical, needle-like, etc.), and composition (iron and its oxides, cobalt, nickel, etc.), (2) apply a coating of a variable thickness (about 1 nm to 10 µm) and/or in multilayers (1 to 10 or more layers), and (3) dispersing the coated particles in a medium (aqueous, oils, and the like). The main properties attained by the present invention include magnetic, optical, thermal, electrical, Theological, lubrication, and biological, in various combinations. The properties of the fluid can be easily tuned by either altering the material properties, or the proportion of applied stimuli. Table 1 (below) lists various tunable parameters for the fluid of the present invention.

BRIEF DESCRIPTION OF THE DRAWINGS

The above and other objects, novel features and advantages of the present invention will become apparent from the following detailed description of the invention, as illustrated in the drawings, in which:

FIG. 2 is an enlarged cross-sectional view of an embodiment of a multifunctional particle in accordance with the present invention;

FIG. 3 is an enlarged cross-sectional view of a multifunctional particle with two layers of generally the same thickness;

FIG. 4 is a view similar to FIG. 3, showing a multifunctional particle with two layers of different thicknesses;

FIG. 9 is a schematic illustration of a magneto-responsive functional fluid showing controlling or arresting internal hemorrhage;

FIG. 11 is a schematic illustration of an optical fluid showing a change in transparency upon application of light intensity;

DETAILED DESCRIPTION OF THE INVENTION

Figure 1:
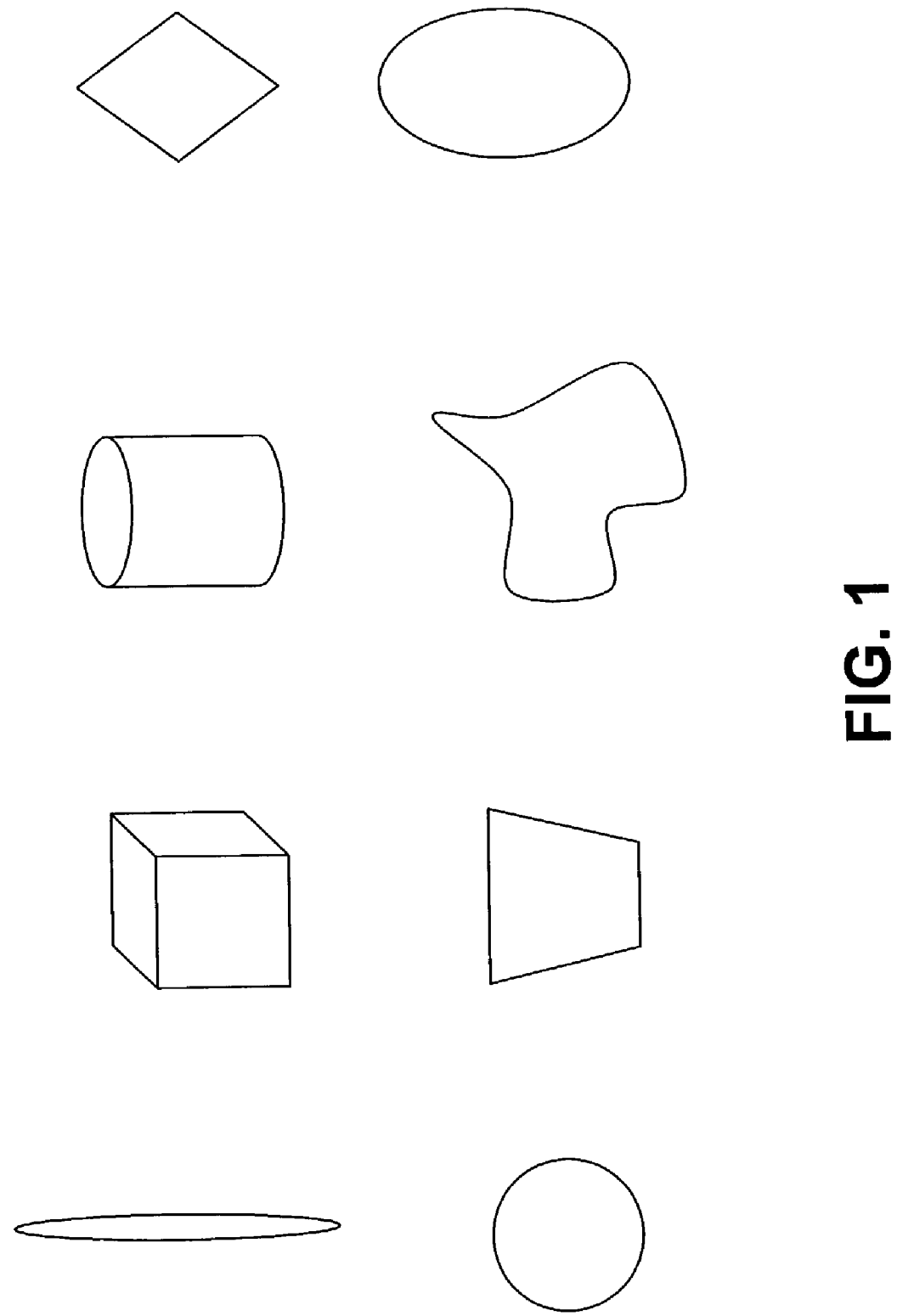
FIG. 1 is a schematic illustration of various shapes for the core particles in accordance with the present invention.

A multifunctional fluid, in accordance with the present invention, is capable of exhibiting substantially simultaneous variations in one or more of its properties, when subjected to one or more specific stimuli. The multifunctional fluid includes one or more core particles with one or more coatings, dispersed in a suitable carrier medium. While the overall properties of the fluid are generally dictated by all three components, the core particles contribute the main desirable property, while the coatings and the carrier medium adds various other variable functionalities.

The core particles that are the subject of the present invention can be synthesized by various methods, such as chemical synthesis, sol-gel, chemical co-precipitation and rapid solidification. The microwave plasma technique, described in U.S. Pat. No. 6,409,851, issued Jun. 25, 2002 (incorporated herein in its entirety by reference) is the preferred technique as it can make a wide spectrum of particles with high purity. The properties of the particle, including electrical, thermal, magnetic or optical, vary significantly with the size of the particle. Tailoring the size of the particle can be used as a tool to effect required changes in the system.

The functional fluid of the present invention, includes core particles, preferably having an average particle size of about 1 nm to 500 μm. Other parameters, as listed below in Table 1, influence the desired functionality of the final fluid, and can be controlled by optimizing the synthesis process. For example, as the shape of the particle changes, so does the active surface area and the filled-up volume.

TABLE 1

List of Tunable Material Properties

| Material Properties | | External Stimuli | |
|---|---|---|---|
| Particle Size | 1 nm-500 μm | Magnetic Field | 0-1000 T |
| Particle Shape | spherical, needle shaped, irregular, oblong, cubical, cylindrical | Electric Field | 0-10 KV/mm |
| | | Laser Impulse | |
| | | Thermal Fields | 0-2,000° C. |

TABLE 1-continued

List of Tunable Material Properties

| Material Properties | | External Stimuli | |
|---|---|---|---|
| Particle Concentration | 0-100% | Polychromatic Light | |
| Particle Composition | | Shear Field | 0-80,000 KPa |
| Particle size Distribution | | Mechanical Force | 0-500 GPa |
| Coating Thickness | 1 nm-10 μm (preferred) | | |
| Number of Coated Layers | 1-10 (preferred) | | |
| Coating Material Composition | polymers, ceramics, metals, intermetallics, alloy | | |

The particles can be made of metal, polymer, ceramic material, intermetallic material, alloy, or a combination thereof. Preferable examples of the metal include iron, cobalt, nickel, copper, gold, silver, chromium, tungsten, silicon, aluminum, zinc, magnesium, titanium, molybdenum, tin, vanadium, germanium, zirconium, niobium, rhenium, iridium, cadmium, indium, hafnium, tantalum, platinum, neodymium, gallium, zinc, and a combination thereof. Preferable examples of the polymer include polystyrene, polymethyl methacrylate, polyvinyl alcohol, polyphenylene vinylene, and a combination thereof. Preferable examples of the ceramic material include iron oxide, zinc ferrite, manganese ferrite, zinc oxide, aluminum oxide, silicon dioxide, silicon carbide, boron carbide, carbon and its types, indium oxide, titania, aluminum nitride, zirconia, tin oxide, chromium oxide, yttrium oxide, niobium oxide, hafnium oxide, tantalum oxide, tungsten oxide, magnesium oxide, boron nitride, silicon nitride, hafnium nitride, tantalum nitride, tungsten nitride, iron nitride, vanadium nitride, titanium, silicon carbide, chromium carbide, vanadium carbide, titanium carbide, iron carbide, zirconium carbide, niobium carbide, hafnium carbide, tungsten carbide, tantalum carbide, titanium diboride, vanadium boride, iron boride, zirconium diboride, hafnium diboride, tantalum diboride, nickel boride, cobalt boride, chromium boride, and a combination thereof. Preferable examples of the intermetallic material include titanium aluminide, niobium aluminide, iron aluminide, nickel aluminide, ruthenium aluminide, iridium aluminide, chromium aluminide, titanium silicide, niobium silicide, zirconium silicide, molybdenum silicide, hafnium silicide, tantalum silicide, tungsten silicide, iron silicide, cobalt silicide, nickel silicide, magnesium silicide, yttrium silicide, cadmium silicide, berryllium oxide, nickel berryllide, niobium berryllide, tantalum berryllide, yttrium berryllide, tantalum berryllide, zirconium berryllide, and a combination thereof. Preferable examples of the alloy include indium tin oxide, cadmium selenide, iron-cobalt, ferro-nickel, ferro-silicon, ferro-manganese, ferro-magnesium, brass, bronze, steel, a combination of two or more of the aforementioned metals, and a combination thereof.

Preferable examples of the shape of the particles, utilized in the present invention, include spherical, needle-shaped, cubic, oval, irregular, cylindrical, diamond-shaped, lamellar, polyhedral, and a combination thereof (FIG. 1).

The present invention involves uniformly coating particles (noted above) with adherent layers of one or more materials, either in the gas or the liquid phase using techniques, such as sol-gel, chemical precipitation, chemical vapor deposition, plasma vapor deposition, gas phase condensation, evaporation and sublimation. During the gas phase process, the precursors or starting materials for synthesizing particles, as well as the coating material (in liquid or molten form) are subjected to high thermal energy. The uniformity and extent of coating(s) are controlled by varying operating parameters, such as temperature, feeding rate and proportions (of the starting materials or precursors), and the pressure of the process. The number of coated layers will depend simply on the feed composition and their concentration. One of the important advantages of the gas phase coating process is that it does not allow any gases or static charges to get adsorbed on the particle surface, thereby maintaining phase purity.

The liquid phase process is typically a chemical synthesis route in which the coating is established by reduction of the precursor (or starting material) while the favorable reaction site is the surface of the particles. In contrast to the gas phase reaction, this technique proves useful only in materials, which readily undergo reduction in a solution phase. Inert species, such as gold or silver, and gel forming polymers, such as polyethylene glycol and dextran, are a few examples. One of the primary advantages of this technique is that coating is established in stages, which gives precise control over the coating thickness and uniformity of layers in a multilayered system.

In the case of polymer coating, the solution route may be similar to a core-shell polymerization while the gas phase would relate to a thermally assisted free radical polymerization reaction. The type of polymer (hydrophilic, i.e., water-loving, or hydrophobic, i.e., insoluble in water) would decide the nature of carrier fluid, such as water, oil, or the like, in which these coated particles can be effectively dispersed.

Preferably, one to ten coatings are provided, and each has a thickness range of about 1 nm to 500 μm, and preferably 1 nm to 10 μm. The coatings can have generally the same or varying thicknesses. It is noted that it is within the scope of the present invention to provide more than ten coatings of a different range of thickness.

The coating can be made of metal, polymer, ceramic material, intermetallic material, alloy, or a combination thereof. Preferable examples of the metal include iron, cobalt, nickel, copper, gold, silver, chromium, tungsten, silicon, aluminum, zinc, magnesium, titanium, molybdenum, tin, indium, bismuth, vanadium, magnesium, germanium, zirconium, niobium, rhenium, iridium, cadmium, indium, hafnium, tantalum, platinum, neodymium, gallium, zinc, and a combination thereof. Preferable examples of the polymer include polyethylene glycol, sorbitol, manitol, starch, dextran, polymethyl methacrylate, polyaniline, polystyrene, poly pyrolle, N-isopropyl acrylamide, acrylamide, lecithin, and a combination thereof. Preferable examples of the ceramic material include iron oxide, zinc ferrite, manganese ferrite, zinc oxide, aluminum oxide, silicon dioxide, silicon carbide, boron carbide, carbon and its types, indium oxide, titania, aluminum nitride, zirconia, tin oxide, chromium oxide, yttrium oxide, niobium oxide, hafnium oxide, tantalum oxide, tungsten oxide, magnesium oxide, boron nitride, silicon nitride, hafnium nitride, tantalum nitride, tungsten nitride, iron nitride, vanadium nitride, titanium, silicon carbide, chromium carbide, vanadium carbide, titanium carbide, iron carbide, zirconium carbide, niobium carbide, hafnium carbide, tungsten carbide, tantalum carbide, titanium diboride, vanadium boride, iron boride, zirconium diboride, hafnium diboride, tantalum diboride, nickel boride, cobalt boride, chromium boride, and a combination thereof. Preferable examples of the intermetallic material include titanium aluminide, niobium aluminide, iron aluminide, nickel aluminide, ruthenium aluminide, iridium aluminide, chromium aluminide, titanium silicide, niobium silicide, zirconium silicide, molybdenum silicide, hafnium silicide, tantalum silicide, tungsten silicide, iron silicide, cobalt silicide, nickel silicide, magnesium silicide, yttrium silicide, cadmium silicide, beryllium oxide, nickel berryllide, niobium berryllide, tantalum berryllide, yttrium berryllide, tantalum berryllide, zirconium berryllide, and a combination thereof. Preferable examples of the alloy include indium tin oxide, cadmium selenide, iron-cobalt, ferro-nickel, ferro-silicon, ferromanganese, ferro-magnesium, brass, bronze, steel, a combination of two or more of the aforementioned metals, and a combination thereof.

The final property of the fluid will preferably depend upon the nature and type of carrier medium. In one embodiment, water alone can be used. However, water miscible organic solvents, such as ethanol, glycerol, ethylene glycol, propanol, dimethyl formamide, and the like can be used. Water-based carrier fluids may also be used in various biological applications, such as imaging or drug targeting. In another embodiment, wherein the application requires higher viscosity, oil may be used. The coated particle, when dispersed in a high viscosity fluid, would reduce their natural Brownian motion, thereby rendering a higher level of stability to the system.

A non-limiting example of the carrier fluid that may be used in the present invention, includes water, mineral oil, hydraulic oil, silicone oil, vegetable oil (corn oil, peanut oil and the like), ethanol, glycerol, ethylene glycol, propanol, dimethyl formamide, paraffin wax, and a combination thereof.

The particles and their respective coatings essentially define the properties for the entire fluid. However, properties, such as optical, thermal or magnetic, are all dependent upon the force distribution between the particles, which is closely related to the interparticle distance. In general, microscopic properties are strongly affected by the force fields and the interfacial contact area. In order to get superior functionality, it is preferred that the particles do not agglomerate. The present invention therefore utilizes a dispersant (or surfactant) stabilized system, wherein the agent assists the particles in remaining dispersed and reduces their tendency to get settled. Preferable examples of surfactants include: dextran, starch, lecithin, glycol, glycerol, sorbitol, manitol, oleic acid, polyethylene glycol, and a combination thereof.

FIGS. 2-4 illustrate an embodiment of a multifunctional particle MFP made in accordance with the present invention. As shown in FIG. 2, a core particle 10, made of a magnetic material (iron), is provided with three layers 12, 14 and 16 of optically-sensitive (gold), heat-absorbing (copper), and electrically-conductive (silica) materials, respectively. FIG. 3 illustrates a multifunctional particle MFP, which includes a core particle 18 provided with two layers 20 and 22 of the same thickness, and FIG. 4 illustrates a multifunctional particle MFP, which includes a core particle 24 provided with two layers 26 and 28 of different thicknesses.

Figure 5:
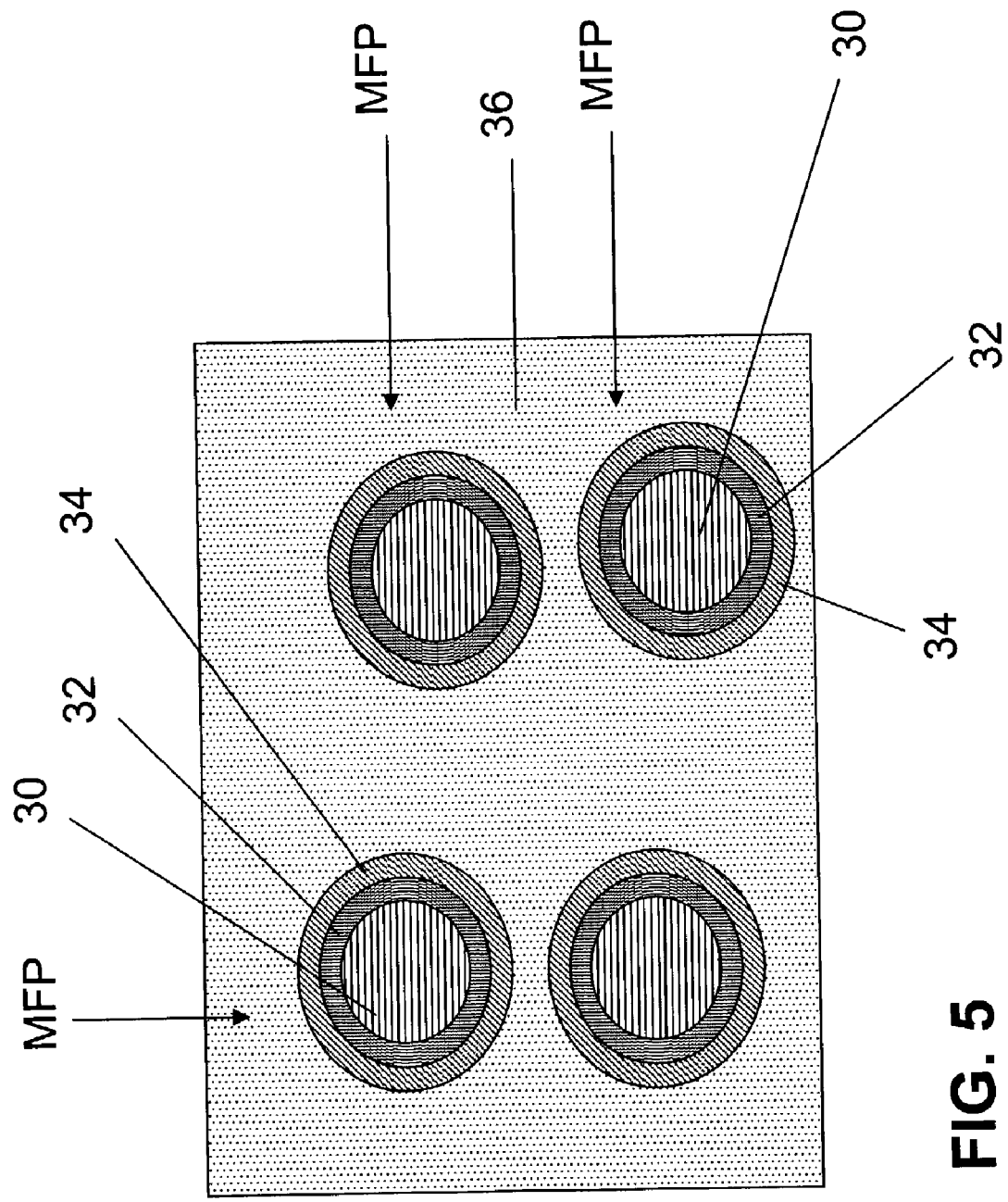
FIG. 5 is a schematic view showing a multifunctional fluid.

FIG. 5 illustrates a fluid wherein multifunctional particles MFP, each including a core particle 30 with two layers 32 and 34, are dispersed in a suitable carrier medium 36 to form a multifunctional fluid or composition.

The present invention provides fluids which can exhibit multifunctional characteristics. These include optical, magnetic, thermal, electrical, rheological and biological properties that can be controlled (or altered) by one or more external stimuli. The core particle represents the main properties, while the coatings and the carrier medium contribute to other accompanying functionalities. The fluid according to the present invention, preferably contains all the components, which are non-interactive and the properties do not interact with each other.

In order to achieve the highest performance efficiency, it is desirable that both the core and one or more coatings remain intact. In particular, since the selected and/or the desired properties are derived from the core and coating(s), it is preferred that the core and coating(s) remain stable and intact from the time of manufacture to storage and through use. If the coating(s) was to separate from the core, dissolve or otherwise disintegrate, the utility of the coated particulate material would be compromised or lost. Thus, the core and coating(s) are designed or manufactured so as not to dissociate, dissolve or disintegrate due, for example, to temperature variations, interaction with moisture, soil, water, bodily fluids, etc. The coating(s) is, therefore, permanent or non-sacrificial in nature. In this regard, it is preferred that the core and coating(s) remain stable for a period of at least one year, from manufacture.

Preferably, one of the coatings is made of or includes a surfactant material, and alone, or with the core, provides the particulate material and/or the composition with at least one property selected from the group including magnetic, thermal, optical, electrical, biological, chemical, lubrication, rheological, and a combination thereof.

The following embodiments illustrate non-limiting examples of various types of fluids prepared in accordance of the present invention.

Magneto-Responsive Functional Fluids

Figure 6:
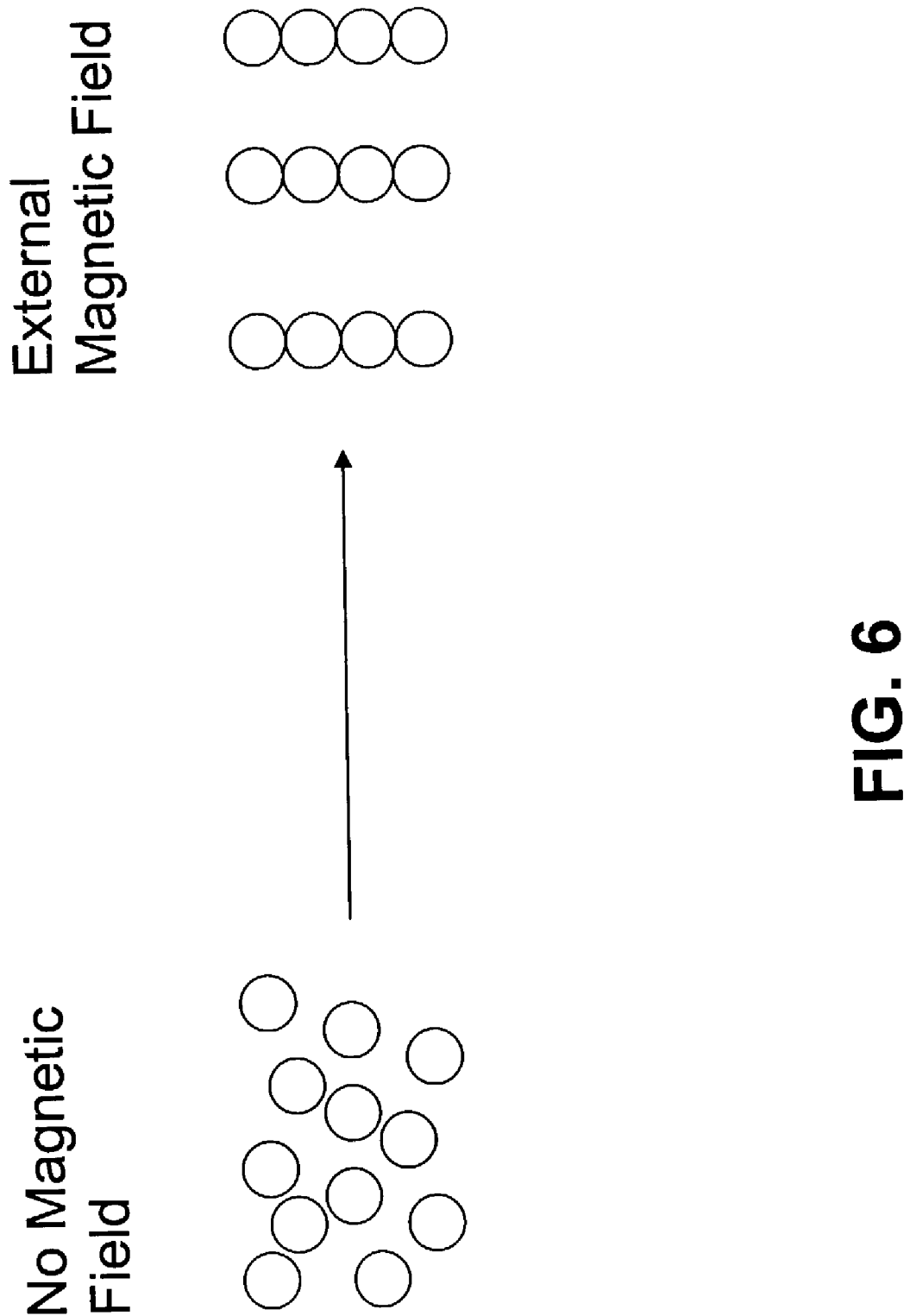
FIG. 6 is a schematic illustration of magneto-responsive functional particles showing a change in viscosity upon application of a magnetic field.

Magnetic particles, preferably of Fe, Co, Ni, $Fe_2O_3$ or ferrites (about 2% to 90 vol % concentrations, i.e., about 2 to 90 vol % of the fluid is comprised of the magnetic particles, dispersed in various media, such as water, mineral oil, glycerol, elastomers, polymeric liquids, organic solvents and the like, exhibit a change in viscosity upon interaction with a magnetic field (FIG. 6). The change in rheology can be controlled by intrinsically altering the magnetic properties of the particles or by variation in the magnitude of the external magnetic field. The magnetic properties, such as magnetic saturation and coercivity, of the particles are dependent upon the shape and size of the particle, which can be precisely controlled and varied in the present invention (see Tables 2 and 3 below). In some applications that demand variable rheological behavior or gradient, the use of a mixture of particles, such as a mixture of iron and cobalt, mixture of iron and samarium-cobalt alloy, with different magnetic moments is preferred over a single component fluid.

One example is coating of magnetic particles with thermally conducting metal, such as copper, aluminum, silica, aluminum oxide, and tungsten. This can be introduced via a conventionally known reverse miceller procedure, wherein the coating is established in a solution phase. The thermal coating would absorb any heat, which may have been generated due to the motion of particles in the medium. These fluids are useful in all mechanical applications of magnetic fluid technology, such as dampers, clutches and shock absorbers.

TABLE 2

Change in Coercivity with Particle Size

| Material | Particle Size | Coercivity (Oe) |
|---|---|---|
| Iron | 25 nm | 460 |
|  | 100 nm | 360 |
| Cobalt | 45 nm | 157 |
|  | 150 nm | 128 |

TABLE 2-continued

Change in Coercivity with Particle Size

| Material | Particle Size | Coercivity (Oe) |
|---|---|---|
| Iron Oxide | 40 nm | 176 |
|  | 150 nm | 200 |

TABLE 3

Change in Magnetic Saturation with Particle Size

| Material | Particle Size | Magnetic Saturation (emu/gm) |
|---|---|---|
| Iron | 25 nm | 170 |
|  | 100 nm | 140 |
| Cobalt | 45 nm | 60 |
|  | 150 nm | 135 |
| Iron Oxide | 40 nm | 40 |
|  | 150 nm | 125 |

Figure 7:
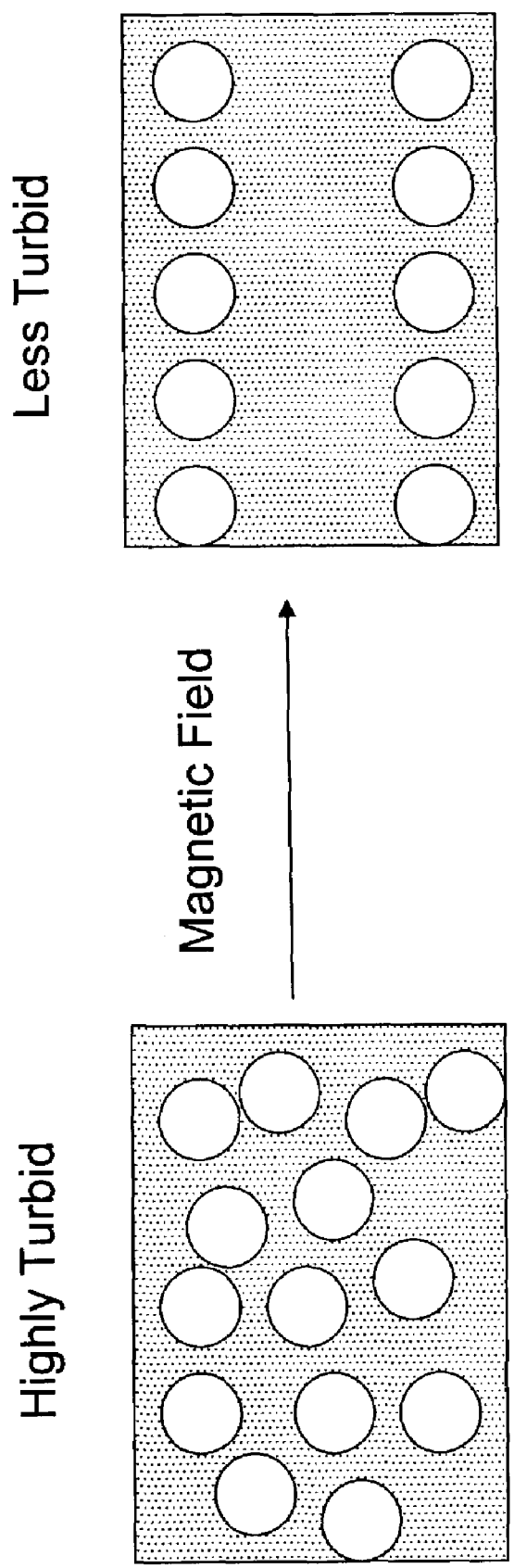
FIG. 7 is a schematic illustration of a magneto-optic functional fluid showing a change in turbidity upon application of a magnetic field.

In another embodiment, magnetic particles are dispersed in an optically clear matrix, such a polymethyl methacrylate (PMMA), polycarbonate, indium oxide, or the like polymer. Optically clear materials in general are transparent to white light and have very low coefficient of absorption. The turbidity (or transparency) would be a function of the loading level of the particles. However, at constant solid's content, the application of magnetic field would align the particles, thereby forming a layered structure (FIG. 7). When the distance between the layers is about one-half the order of magnitude of visible light, 400-800 nm, classical Bragg diffraction will result in forbidden bands at typical frequencies. These forbidden states will disappear as soon as the magnetic field is removed and allow light of all wavelengths to pass, thus forming an on-off magnetically controlled optical switch. The size of the particles and their concentration (vol % in the fluid) will determine the maximum dip in intensity, while the distance between the chains of magnetic particles will determine the frequency of the photonic bandgap. Thus, color agile switches can be made. An example is a 500 nm colloidal silica suspension at about 70% concentration in a titanium oxide matrix.

In yet another embodiment, coated polymer magnetic particles exhibited sharp magnetic switching effects. This is believed to be due to the dipolar contribution of the polymer that directly influences the interparticle interactions. Magnetic bistability and switching at low fields obtained in polymer-coated particles would be desirable in systems where the impedance in response to electrical or magnetic stimuli needs to be monitored with high precision. These compositions would therefore be of interest in, for example, RF switching and EMI shielding applications.

Figure 8:
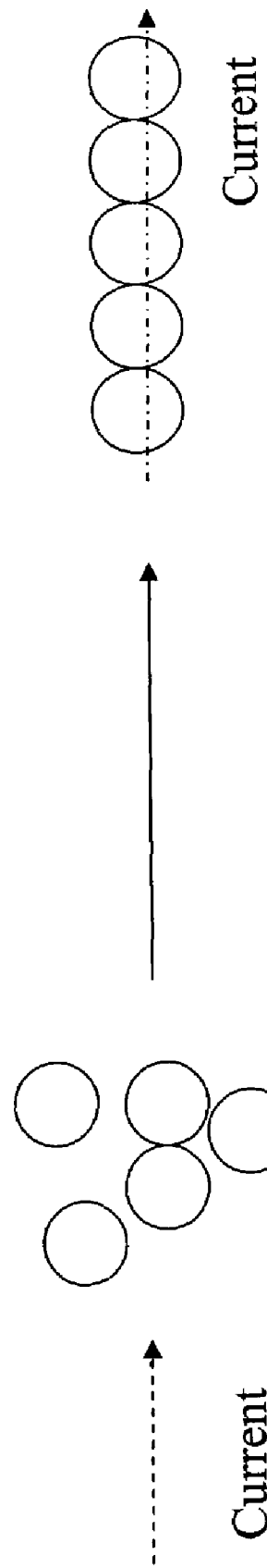
FIG. 8 is a schematic illustration of magneto-responsive functional particles showing an increase in electrical pathway.

The above-noted fluids can be slightly modified to obtain magnetically controlled conductive composites, wherein magnetic particles, such as ferrites, are doped in conductive polymers, such as polyaniline, or polyphenylene vinylenes (PPV). As the particles are aligned in chains, an increase in electrical pathway is seen (FIG. 8). Hence, a magnetically tunable composite fluid can be produced in accordance with the present invention.

Using the magnetic fluid technology, a biological fluid is produced. This fluid includes biocompatible magnetic particles. The biocompatibility is due of the coating of polymers, such as dextran, starch, polyethylene glycol, sorbitol, or the like. The fluid can be injected inside the body to arrest internal hemorrhage or seal off blood vessels in order to inhibit angiogenesis. The sealing action is a result of a reversible viscosity increase in the presence of an externally positioned magnet.

As shown in FIG. 9, magnetic particles 38, coated with a biocompatible surfactant and/or surface attached with desirable reagent/medicine/drug, are dispersed in a blood vessel 40. The particles 38 are aligned to form a blockage 42 upon application of a magnetic field by magnets 44, thereby arresting hemorrhage 46.

Figure 10:
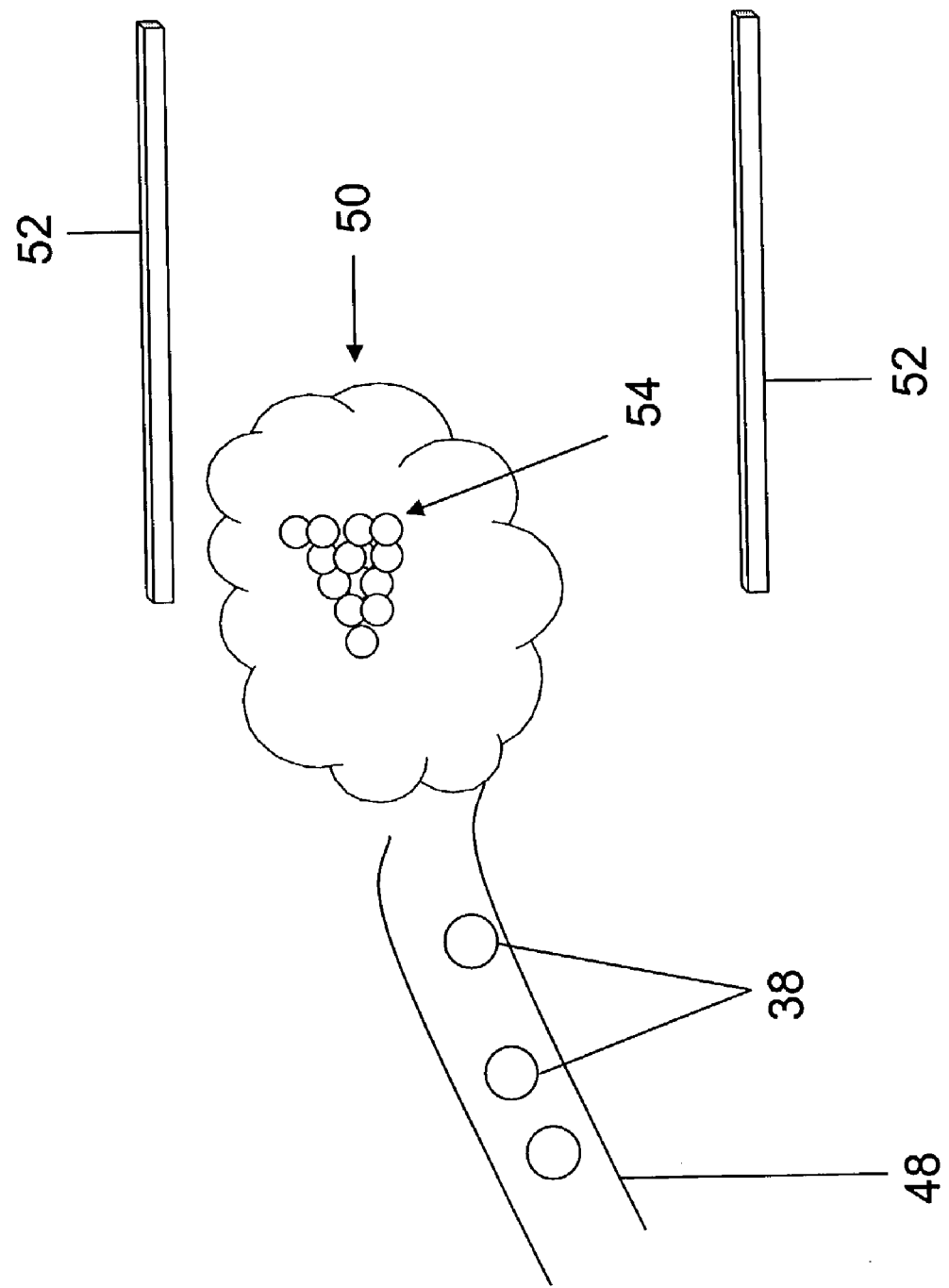
FIG. 10 is a schematic illustration of a magneto-responsive functional fluid showing inhibiting angiogenesis.

FIG. 10 illustrates the use of magnetic particles 38 in inhibiting angiogenesis. As shown, particles 38 are carried through the blood vessel 48 that feeds the target organ 50. The application of a magnetic field by magnets 52 causes agglomeration 54 of the particles carrying the desired drug.

Optical Fluids

A fluid which exhibits optical multifunctionality is disclosed. This fluid is capable of transmitting visible light at a broad range of temperature range. The optical properties of fluids seem to drastically change as a function of increasing temperature, typically increasing their attenuation. In accordance with the present invention, optically clear ceramic particles, such as ZnO or InO, are coated with a thin layer of copper having a thickness of about 10 nm to 100 nm. The coating thickness is limited by the optical clarity of the fluid. When the fluid is subjected to a temperature increase, all or part of the heat is absorbed by the surrounding copper layer, thereby averting any turbidity that may have been caused due to the input of heat.

In another embodiment, semiconductor nanocrystals, such as gallium arsenide, silicon carbide, silicon, germanium, cadmium selenide, and a combination thereof, are dispersed in an index matching liquid, such as water, oil, mixture of water and oil, polyethylene glycol, polymethylmethacrylate, polyacrylamide, polystyrene, and a combination thereof. The fluid is subjected to a laser impulse of fixed wavelength. As the intensity of the input laser is increased, the refractive index mismatch increases, thereby lowering the transparency of the medium (FIG. 11). Hence, the transparency of the medium is a function of the intensity of the incident light source. Changing the size and loading levels of the nanocrystals can be used to tune the optical limiting frequency.

Figure 12:
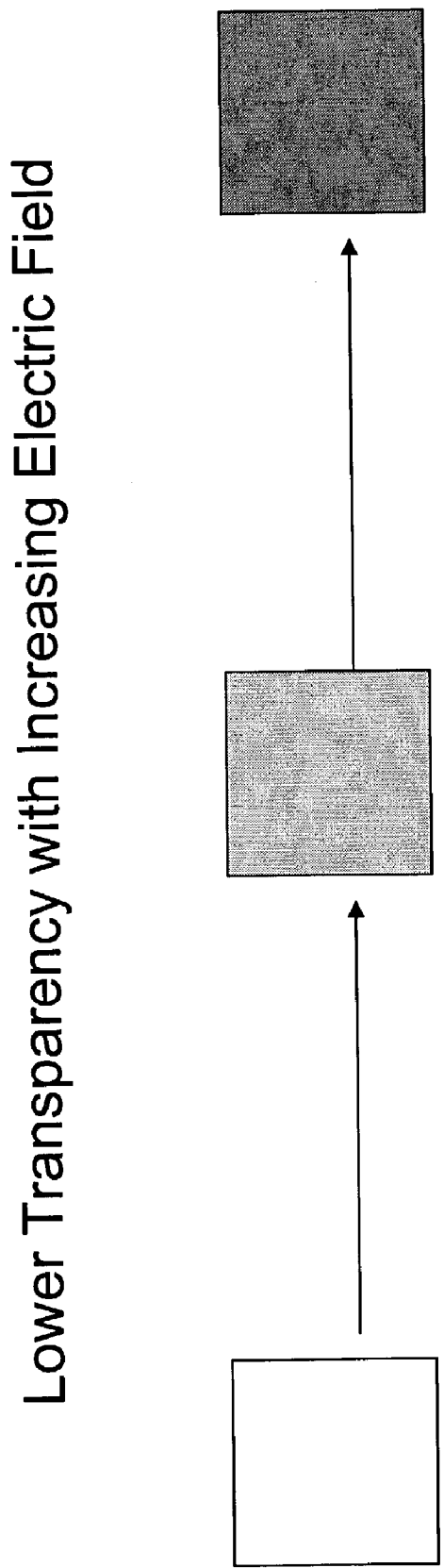
FIG. 12 is a schematic illustration of an electro-optical functional fluid showing a change in transparency with increasing electric field.

In yet another embodiment, Cu-coated ceramic particles are dispersed in a conducting matrix. The transparency of this fluid changes from clear (about 100% transmittance) to opaque (0% transmittance), as a function of the varying electric field (0 Å to 1000 Å) (FIG. 12). These fluids would be desirable in applications such as optical limiters.

Figure 13:
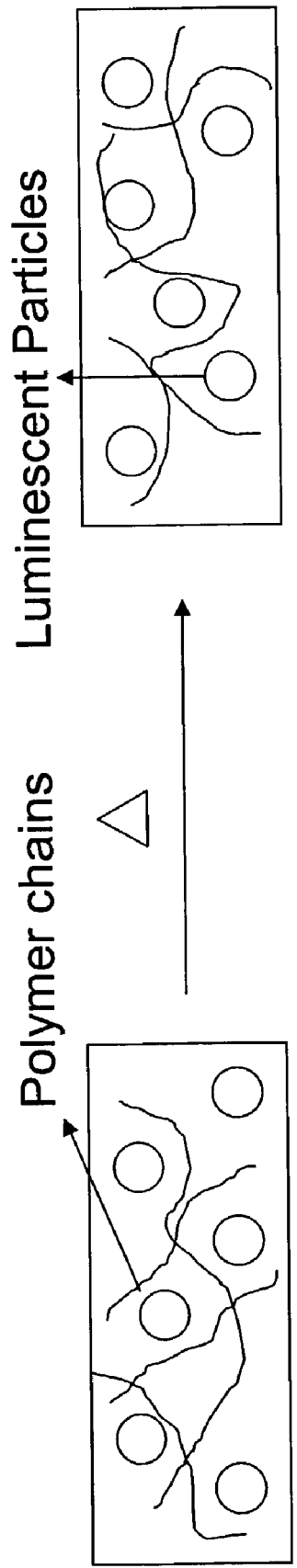
FIG. 13 is a schematic illustration of a thermo-optical functional fluid showing a change in color due to a change in temperature.

The present invention further discloses luminescent particles of gold and silver, which have a characteristic size on the order of the wavelength of visible light. These particles are embedded in a thermally switchable polymer matrix, such as N-isoproplylacrylamide, polyvinyl alcohol, polyethylene glycol, polyalkelene glycol, and a combination thereof. These polymeric gels possess a lower critical solution temperature of about room temperature. Above and below this temperature, there are significant differences between the excluded free volumes, which change the configuration of the encapsulated particles resulting in change in color (FIG. 13). This property could be used in the fabrication of, for example, a temperature sensor.

Figure 14:
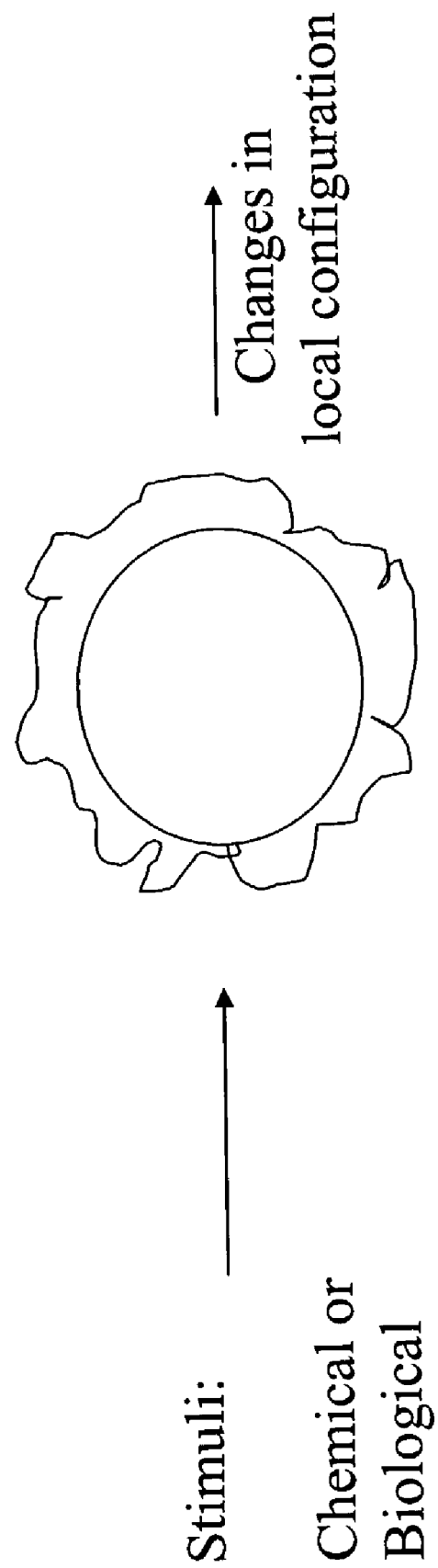
FIG. 14 is a schematic illustration of an optical fluid showing a change in color with the application of a chemical or biological stimulus.

The embodiment of FIG. 13, could be slightly modified to fabricate an optical sensing fluid. Colloidal particles of gold or silver, coated with molecular recognition species, are dispersed in an aqueous or clear organic carrier medium. The interaction of molecules with a chemical or biological stimuli would alter the local configuration of the particles, thereby changing their reflecting color (FIG. 14).

Electro-responsive Functional Fluids

Figure 15:
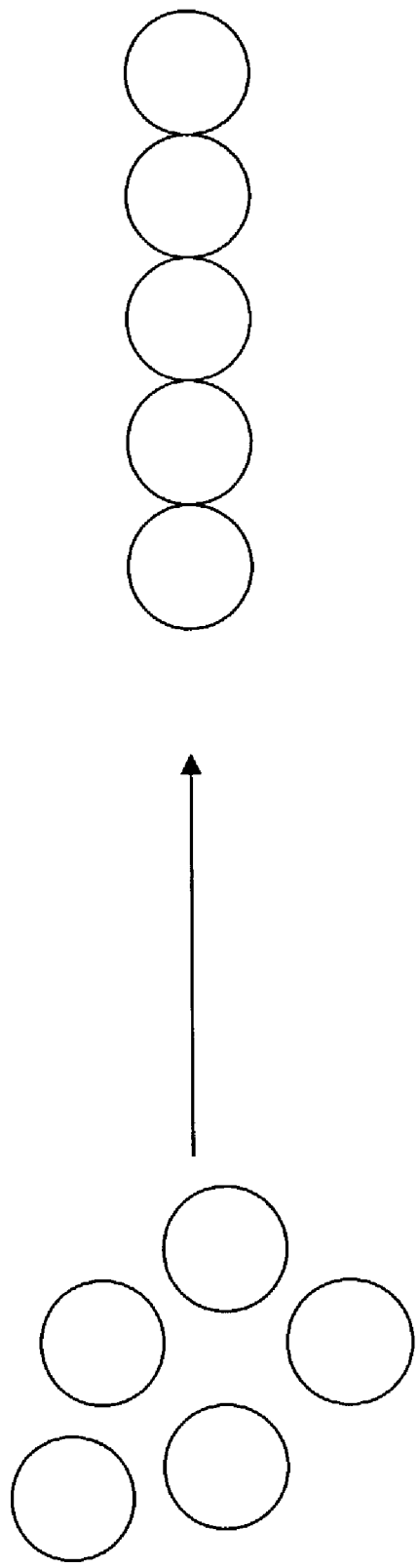
FIG. 15 is a schematic illustration of an electro-responsive functional fluid showing a change in viscosity upon application of an electric field.

An electrically tunable fluid is disclosed. This includes silica particles coated with Cu (about 10 nm to 10 μm thickness) in a dielectric solvent, such as water, mineral oil, polypyrole, polyaniline, ethylene glycol, and a combination thereof. As the electric potential increases, 0-10 KV/mm, the rheology (change in viscosity ranging from 1.0 cP to 200,000 cP) of the medium changes. In addition, the electric current increases the thermal energy of the entire system (FIG. 15). However, in the fluid of the present invention, the copper coating absorbs all the excess thermal energy produced. Thus, simultaneous rheology and thermal control can be affected. This fluid would be found to be highly useful in applications demanding instantaneous change in viscosity under severe temperature conditions, such as in aircraft seals, automobile clutches and brakes, and vibration isolation in structures.

Multifunctional Biological Fluid

A fluid capable of delivering drugs to a targeted body site is disclosed. The selected drug is attached to a magnetic core of iron or ferrites, cobalt or nickel coated with an optical layer of fluorescent Au or Ag molecules. The fluid particles are then magnetically driven to the target site where the drug is desorbed. Optical capturing, which is a consequence of the fluorescent molecules, assists in the magnetic localization.

The fluid of the previous embodiment can be extended to magnetic bioseparation and detection. For example, magnetic particles can be functionalized with a bioligand, which specifically binds to a target molecule, cell, toxin, pathogen, DNA, RNA, proteins, and other biochemicals. This would isolate the required biomolecule from a mixture and the number of separated magnetic particles can be detected with the help of highly sensitive magnetic field sensors, such as HGMS (high gradient magnetic separators), or SQUID (Superconducting Quantum Interface Design).

All of these modules can be miniaturized and placed on a microchip where micropumps would inject the sample fluid into various microchambers/microreactors. The microreactors will contain a multifunctional biological fluid with different anylate specificity. Embedded in the reactors would be highly sensitive magnetic particle sensors, which will transduce the signal in to a user-friendly output.

Based on the above, gas sensors for CO, $CO_2$, $O_2$, and the like, chemical sensors for water and other liquids, and biological sensors for glucose, DNA, and the like can be easily made.

Frequency Agile Functional Fluids

A functional fluid capable of switching from a RF (radiofrequency) transparent to RF opaque state is disclosed. The core can be either magnetic, such as Fe, Co, Ni, etc., or conducting, such as Cu, Ag, Au, polymers, such as polyaniline, polypyrolle, etc., and the encapsulating polymer matrix can be polystyrene or PMMA. Variations in electric or magnetic field will cause local permeability variations to effect RF limiting features.

In another embodiment, indium tin oxide in a silica, alumina or titanium oxide matrix are subjected to varying electric fields. The electric field changes the oxidation state of the metal oxide particles, thereby exhibiting an electrochromic effect.

In yet another embodiment, semiconductor nanocrystals, such as CdSe are dispersed in a polymer matrix containing a dye. As the intensity of the light changes, a photochromic effect is observed. This is due to optical nonlinearity possessed by semiconductor species. These photochromic fluids may be made to form a flexible polymer sheet, which would be useful in making, for example, automatic automobile sunshades, etc.

Other Functional Fluids

Multifunctionality in fluids is highly desirable. In general, upon interaction of one energy form with the other, there is a creation of a third energy component to meet the law of conservation of energy. For example, SiC-based particles used as abrasives generate a lot of heat, which may severely damage the surface they are acting on. The present invention addresses this by coating SiC particles with a coating of Au, Ag, Cu, Ni, or the like. An abrasive fluid, including SiC coated particles, can be used in sensitive applications, such as in microelectronics where heat is a big deterrent and causes damage to microelectronic circuitry. Other abrasive particles that can likewise be coated with a heat-absorbing material, include those made of boron carbide, iron carbide, aluminum oxide, zirconium oxide, titanium diboride, silica, yttrium-aluminum-garnet, or a combination thereof.

Figure 16:
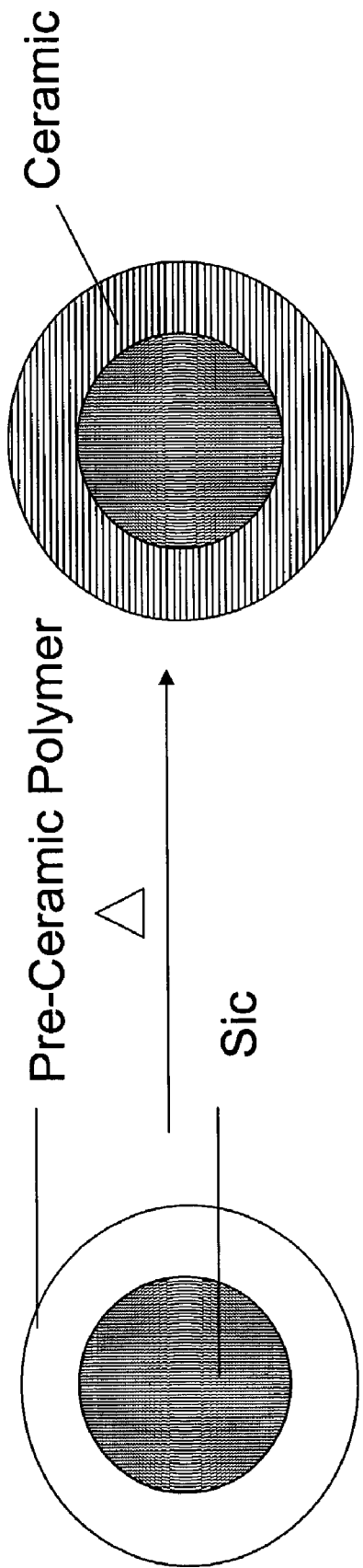
FIG. 16 is a schematic illustration of a functional fluid wherein a pre-ceramic polymer coating on a core particle becomes ceramic when heat is applied.

In another embodiment, SiC particles are coated with a pre-ceramic polymer, such as polysilsesquioxane or polycarbosilane. These are structural materials useful in flame-resistance and high temperature applications, where the pre-ceramic polymer turns into a ceramic with applied heat (FIG. 16). The use of a polymer in structures generally gives the benefits of adhesion and aesthetics, while ceramics are used for high temperature stability.

In yet another embodiment, a self-lubricating high temperature functional fluid is disclosed. The core particle can be made of Cu, while the coatings can be of graphite, bismuth, indium or Teflon®. The coated copper particles are dispersed in oils, such as hydraulic oil or mineral oil. These fluids can be used in various engineering structures, such as engines and transmission housing.

In yet another embodiment, a quenching fluid used in heat-treating operation of metals, such as quenching, tempering, austempering and martempering is disclosed. The fluid removes heat from the heated metal. The cooling rate determines the microstructure, such as grain size, grain shape and phase (alpha, gamma, beta, delta, austenite, matensite, bainite, pearlite, cementite) composition of the part being made. The cooling rate can be adjusted by adjusting the thermal conductivity of the fluid. By incorporating polymer-coated particles with desired thermal conductivities in the quenching fluid, the cooling rate can be adjusted or controlled. The coating thickness preferably varies from 1 nm to 100 μm with the number of layers ranging preferably from one to ten. The polymer coating is preferably based on polyalkylene glycol, polyvinyl alcohol, or a combination thereof. The particles can be metals (aluminum, titanium, copper, silicon, zinc, iron, cobalt, nickel, chromium, bismuth, silver, tungsten, molybdenum, or a combination thereof), ceramics (graphite, aluminum oxide, silicon oxide, beryllium oxide, titanium boride, molybdenum boride, silicon carbide, boron carbide, zirconium boride, hafnium boride, aluminium nitride, iron oxide, or a combination thereof) intermetallics (molybdenum silicide, titanium aluminides, nickel aluminides, berrylides, or a combination thereof), or a combination thereof. The coated particles can be dispersed in water, oil (mineral oil, silicone oil, hydraulic oil, synthetic oil, or a combination thereof) or an emulsion (sodium dodecyl sulfate in water, polyethylene glycol in water, polyvinyl alcohol in water, oil in water, polystyrene in water, polyacrylamide in water, or a combination thereof). The composition of the particles can be tailored to obtain different thermal conductivities (0-400 W/m.° K) in the fluid. Similarly, by adjusting the quantity of the particles (1-90 volume %) in the fluid, thermal conductivities can be adjusted.

EXAMPLE 1

Powder particles of iron with particle size of about 20 nm were synthesized from iron pentacarbonyl using microwave plasma synthesis technique. Argon was used as the plasma gas. The iron powders were subsequently coated with a layer of copper measuring with variable thickness (about 1 nm to 1000 nm) using a chemical synthesis technique. These powders were coated with sodium hexametaphosphate for dispersion in hydraulic oil for use as magneto-rheological fluids with a thermal control. The viscosity of the fluid could be changed by the application of a magnetic field to effect damping in shock absorbers used in automobiles and machinery. The copper coating will dissipate the heat generated from the motion of the moving parts in the damper.

Table 4 below shows the effect of the applied magnetic field on the yield stress. The magnetic field is varied by varying the current that is applied. The change in yield stress is effected as a result in the change of viscosity. In other words, an increase in yield stress signifies a higher viscosity.

TABLE 4

Change in Yield Stress with Applied Current

| Applied Current (Amps) | Stress (Pascal) |
|---|---|
| 0 | 208.0 |
| 0.2 | 332.8 |
| 0.4 | 583.2 |
| 0.6 | 916.0 |
| 0.8 | 1291.2 |
| 1.0 | 1562.4 |
| 1.2 | 1791.2 |
| 1.4 | 1978.4 |
| 1.6 | 2145.6 |
| 1.8 | 2332.8 |
| 2.0 | 2416.0 |

EXAMPLE 2

Ultrafine particles of aluminum oxide with a particle size of about 1 nm to 200 nm were prepared using microwave plasma synthesis of aluminum hydroxide using oxygen as the plasma gas. The nanoparticles were coated with a layer of cetyl trimethyl ammonium bromide with a coating thickness from about 1 nm to 20 nm. The coated particles were dispersed in a polyetherimide (PEI) polymer. The particles increased the inherent flame retardancy of the polymer while the fillers increased the mechanical properties and resistance to wear.

| | PEI | PEI + 5 wt % Nano Aluminum Oxide | PEI + 10 wt % Nano Aluminum Oxide |
|---|---|---|---|
| Average Heat Release Rate (KW/m$^2$) | 24.72 | 24.19 | 22.23 |
| Peak Heat Release Rate (KW/m$^2$) | 72.65 | 68.05 | 66.52 |
| Total Heat Release (MJ/m$^2$) | 5.26 | 5.06 | 4.33 |

-continued

|  | PEI | PEI + 5 wt % Nano Aluminum Oxide | PEI + 10 wt % Nano Aluminum Oxide |
|---|---|---|---|
| Time for Extinction of Flame (sec) | 22 | 16 | 14 |

EXAMPLE 3

Powder particles of iron with particle size ranging from about 1 nm to 40 μm were synthesized by microwave plasma synthesis using iron pentacarbonyl as the source and argon as the plasma gas. The powder particles were coated with a layer of polystyrene. The polystyrene coating was carried out in the gas phase in the microwave plasma synthesis. The thickness of the polystyrene ranges from about 1 nm to 100 nm. The coated particles are dispersed in a carrier fluid such as saline solution, water or blood for injection into a human body. These particles may be surface modified with various procoagulants such as thrombin, factor 7A and like for arresting internal hemorrhage. Also, the particles may be attached with various antibodies/drugs/antigens for toxin, purification, isolation of biomolecules, water and chemical pollution and like.

EXAMPLE 4

Aluminum nitride powders with a particle size of about 1 nm to 10 μm were coated with an about 1 nm to 100 nm layer of ethyl cyano acrylate using microwave plasma technique. The aluminum nitride powders were prepared using microwave plasma synthesis of trimethyl aluminum and ammonia. The coated aluminum nitride particles are then dispersed in an adhesive resin for mounting heat sinks to electronic substrates. The aluminum nitride provides effective heat dissipation due to its high thermal conductivity as well as provide good mechanical strength to the adhesive.

EXAMPLE 5

Copper powders with a particle size of about 1 nm to 50 μm were mixed in a solution of ethylene glycol and water. The concentration of the copper powders in the ethylene glycol solution varied from about 10 vol % to 60 vol %. This fluid is used for heat transfer in furnaces, pumps and engines. The ethylene glycol acts as a rust inhibitor while the copper powders help in the removal of heat.

While this invention has been described as having preferred sequences, ranges, steps, materials, or designs, it is understood that it includes further modifications, variations, uses and/or adaptations thereof following in general the principle of the invention, and including such departures from the present disclosure as those come within the known or customary practice in the art to which the invention pertains, and as may be applied to the central features hereinbeforesefforth, and fall within the scope of the invention and of the limits of the appended claims.

The following references, to the extent that they provide exemplary procedural or other details supplementary to those set forth herein, are specifically incorporated herein by reference.

1. Azuma, Y. et al. "Coating of ferric oxide particles with silica by hydrolysis of TEOS", Journal of the Ceramic Society of Japan, 100(5), 646-51 (May 1992).
2. Atarashi, T. et al. "Synthesis of ethylene-glycol-based magnetic fluid using silica-coated iron particle", Journal of Magnetism and Magnetic Materials, 201, 7-10 (1999).
3. Homola, A. M. et al., "Novel Magnetic Dispersions Using Silica Stabilized Particles", IEEE Transactions on Magnetics, 22 (5), 716-719 (September 1986).
4. Giri, A. et al. "AC Magnetic Properties of Compacted FeCo Nanocomposites", Mater. Phys. and Mechanics, 1, 1-10 (2000).

What is claimed is:

1. A particulate material, comprising:
   a) a predetermined amount of core particles with one or more coatings;
   b) one of said one or more coatings comprising a permanent surfactant coating, wherein the core particles and/or at least one of said one or more coatings provides the particulate material with at least one property selected from the group consisting of magnetic, thermal, optical, electrical, biological, chemical, lubrication, rheological, and a combination thereof; and
   c) said core particles having an average particle size of about 1 nm to 500 μm.

2. The particulate material of claim 1, wherein:
   a) said core particles comprise a member selected from the group consisting of a metal, a polymer, a ceramic material, an intermetallic material, an alloy, and a combination thereof.

3. The particulate material of claim 2, wherein:
   a) the metal is selected from the group consisting of copper, cobalt, nickel, aluminum, iron, tin, gold, silver, chromium, molybdenum, tungsten, zinc, silicon, magnesium, titanium, vanadium, magnesium, germanium, zirconium, niobium, rhenium, iridium, cadmium, indium, hafnium, tantalum, platinum, neodymium, gallium, zinc, an alloy, an oxide, and a combination thereof.

4. The particulate material of claim 2, wherein:
   a) the polymer is selected from the group consisting of polystyrene, polymethyl methacrylate, polyvinyl alcohol, polyphenylene vinylene, and a combination thereof.

5. The particulate material of claim 2, wherein:
   a) the ceramic material is selected from the group consisting of iron oxide, zinc ferrite, manganese ferrite, zinc oxide, aluminum oxide, silicon dioxide, silicon carbide, boron carbide, carbon, indium oxide, titania, aluminum nitride, zirconia, tin oxide, chromium oxide, yttrium oxide, niobium oxide, hafnium oxide, tantalum oxide, tungsten oxide, magnesium oxide, boron nitride, silicon nitride, hafnium nitride, tantalum nitride, tungsten nitride, iron nitride, vanadium nitride, titanium, silicon carbide, chromium carbide, vanadium carbide, titanium carbide, iron carbide, zirconium carbide, niobium carbide, hafnium carbide, tungsten carbide, tantalum carbide, titanium diboride, vanadium boride, iron boride, zirconium diboride, hafnium diboride, tantalum diboride, nickel boride, cobalt boride, chromium boride and a combination thereof.

6. The particulate material of claim 2, wherein:
   a) the intermetallic material is selected from the group consisting of titanium aluminide, niobium aluminide, iron aluminide, nickel aluminide, ruthenium aluminide, iridium aluminide, chromium aluminide, titanium silicide, niobium silicide, zirconium silicide, molybdenum silicide, hafnium silicide, tantalum silicide, tungsten silicide, iron silicide, cobalt silicide, nickel silicide, magnesium silicide, yttrium silicide, cadmium silicide, berryllium oxide, nickel berryllide, niobium berryllide, tantalum berryllide, yttrium berryllide, tantalum berryllide, zirconium berryllide, and a combination thereof.

7. The particulate material of claim 2, wherein:
a) the alloy is selected from the group consisting of indium tin oxide, cadmium selenide, iron-cobalt, ferro-nickel, ferro-silicon, ferro-manganese, ferro-magnesium, brass, bronze, steel, and a combination thereof.

8. The particulate material of claim 1, wherein:
a) one of said one or more coatings has a thickness of about 1 nm to 10 μm.

9. The particulate material of claim 8, wherein:
a) a portion of said core particles includes up to ten of said coatings.

10. The particulate material of claim 8, wherein:
a) said coatings have varying thickness.

11. The particulate material of claim 8, wherein:
a) said coatings have generally the same thickness.

12. The particulate material of claim 1, wherein:
a) another one of said coatings comprises a member selected from the group consisting of a metal, a polymer, a ceramic material, an intermetallic material, and an alloy or a combination thereof.

13. The particulate material of claim 1, wherein:
a) said core particles comprise a general shape selected from the group consisting of a sphere, a needle, a cube, an oval, irregular, a cylinder, a diamond, a lamella, a polyhedron, and a combination thereof.

14. The particulate material of claim 12, wherein:
a) the metal is selected from the group consisting of iron, cobalt, nickel, copper, gold, silver, tungsten, silicon, aluminum, zinc, molybdenum, indium, bismuth, vanadium, magnesium, germanium, zirconium, niobium, rhenium, iridium, cadmium, indium, hafnium, tantalum, platinum, neodymium, gallium, zinc, and a combination thereof.

15. The particulate material of claim 12, wherein:
a) the polymer is selected from the group consisting of polyethylene glycol, sorbitol, manitol, starch, dextran, poly methyl methacrylate, polyaniline, polystyrene, poly pyrolle, N-isopropyl acrylamide, acrylamide, lecithin, and a combination thereof.

16. The particulate material of claim 12, wherein:
a) the ceramic material is selected from the group consisting of iron oxide, zinc ferrite, manganese ferrite, zinc oxide, aluminum oxide, silicon dioxide, silicon carbide, boron carbide, carbon, indium oxide, titania, aluminum nitride, zirconia, tin oxide, chromium oxide, yttrium oxide, niobium oxide, hafnium oxide, tantalum oxide, tungsten oxide, magnesium oxide, boron nitride, silicon nitride, hafnium nitride, tantalum nitride, tungsten nitride, iron nitride, vanadium nitride, titanium, silicon carbide, chromium carbide, vanadium carbide, titanium carbide, iron carbide, zirconium carbide, niobium carbide, hafnium carbide, tungsten carbide, tantalum carbide, titanium diboride, vanadium boride, iron boride, zirconium diboride, hafnium diboride, tantalum diboride, nickel boride, cobalt boride, chromium boride and a combination thereof.

17. The particulate material of claim 12, wherein:
a) the intermetallic material is selected from the group consisting of titanium aluminide, niobium aluminide, iron aluminide, nickel aluminide, ruthenium aluminide, iridium aluminide, chromium aluminide, titanium silicide, niobium silicide, zirconium silicide, molybdenum silicide, hafnium silicide, tantalum silicide, tungsten silicide, iron silicide, cobalt silicide, nickel silicide, magnesium silicide, yttrium silicide, cadmium silicide, berryllium oxide, nickel berryllide, niobium berryllide, tantalum berryllide, yttrium berryllide, tantalum berryllide, zirconium berryllide, and a combination thereof.

18. The particulate material of claim 12, wherein:
a) the alloy is selected from the group consisting of ferro-nickel, ferro-silicon, ferro-manganese, ferro-magnesium, brass, bronze, steel, and a combination thereof.

19. The particulate material of claim 1, wherein:
a) said core particles with said one or more coatings selectively interact with one or more of an external stimulus selected from the group consisting of an electric field, a magnetic field, a thermal field, an optical field, and a combination thereof.

20. The particulate material of claim 19, wherein:
a) said core particles interact with one or more of said external stimulus individually or simultaneously.

21. A particulate composition, comprising:
a) a carrier medium;
b) a predetermined amount of a particulate material in said medium;
c) said particulate material comprising core particles with one or more coatings;
d) one of said one or more coatings comprising a permanent surfactant coating, wherein the core particles and/or at least one of said one or more coatings provides the particulate material with at least one property selected from the group consisting of magnetic, thermal, optical, electrical, biological, chemical, lubrication, rheological, and a combination thereof; and
e) said core particles having an average particle size of about 1 nm to 500 μm.

22. The particulate composition of claim 21, wherein:
a) said carrier medium comprises a fluid.

23. The particulate composition of claim 22, wherein:
a) said core particles comprise a member selected from the group consisting of a metal, a polymer, a ceramic material, an intermetallic material, an alloy, and a combination thereof.

24. The particulate composition of claim 23, wherein:
a) the metal is selected from the group consisting of copper, cobalt, nickel, aluminum, iron, tin, gold, silver, chromium, copper, tungsten, zinc, silicon, molybdenum, magnesium, titanium, vanadium, magnesium, germanium, zirconium, niobium, rhenium, iridium, cadmium, indium, hafnium, tantalum, platinum, neodymium, gallium, zinc, an alloy, an oxide, and a combination thereof.

25. The particulate composition of claim 23, wherein:
a) the polymer is selected from the group consisting of polystyrene, polymethyl methacrylate, polyvinyl alcohol, polyphenylene vinylene, and a combination thereof.

26. The particulate composition of claim 23, wherein:
a) the ceramic material is selected from the group consisting of iron oxide, zinc ferrite, manganese ferrite, zinc oxide, aluminum oxide, silicon dioxide, silicon carbide, boron carbide, carbon, indium oxide, titania, aluminum nitride, zirconia, tin oxide, chromium oxide, yttrium oxide, niobium oxide, hafnium oxide, tantalum oxide, tungsten oxide, magnesium oxide, boron nitride, silicon nitride, hafnium nitride, tantalum nitride, tungsten nitride, iron nitride, vanadium nitride, titanium, silicon carbide, chromium carbide, vanadium carbide, titanium carbide, iron carbide, zirconium carbide, niobium carbide, hafnium carbide, tungsten carbide, tantalum carbide, titanium diboride, vanadium boride, iron boride, zirconium diboride, hafnium diboride, tantalum diboride, nickel boride, cobalt boride, chromium boride, and a combination thereof.

27. The particulate composition of claim 23, wherein:
a) the intermetallic material is selected from the group consisting of titanium aluminide, niobium aluminide, iron aluminide, nickel aluminide, ruthenium aluminide, iridium aluminide, chromium aluminide, titanium silicide, niobium silicide, zirconium silicide, molybdenum silicide, hafnium silicide, tantalum silicide, tungsten silicide, iron silicide, cobalt silicide, nickel silicide, magnesium silicide, yttrium silicide, cadmium silicide, berryllium oxide, nickel berryllide, niobium berryllide, tantalum berryllide, yttrium berryllide, tantalum berryllide, zirconium berryllide, and a combination thereof.

28. The particulate composition of claim 23, wherein:
a) the alloy is selected from the group consisting of indium tin oxide, cadmium selenide, iron-cobalt, ferro-nickel, ferro-silicon, ferro-manganese, ferro-magnesium, brass, bronze, steel, and a combination thereof.

29. The particulate composition of claim 22, wherein:
a) one of said one or more coatings has a thickness of about 1 nm to 10 µm.

30. The particulate composition of claim 29, wherein:
a) a portion of said core particles includes up to ten of said coatings.

31. The particulate composition of claim 29, wherein:
a) said coatings have varying thicknesses.

32. The particulate composition of claim 29, wherein:
a) said coatings have generally the same thickness.

33. The particulate composition of claim 22, wherein:
a) another one of said coatings comprises a member selected from the group consisting of a metal, a polymer, a ceramic material, an intermetallic material, an alloy, and a combination thereof.

34. The particulate composition of claim 22, wherein:
a) said core particles comprise a general shape selected from the group consisting of a sphere, a needle, a cube, an oval, irregular, a cylinder, a diamond, a lamella, a polyhedron, and a combination thereof.

35. The particulate composition of claim 33, wherein:
a) the metal is selected from the group consisting of iron, cobalt, nickel, copper, gold, silver, tungsten, silicon, aluminum, zinc, molybdenum, indium, bismuth, vanadium, magnesium, germanium, zirconium, niobium, rhenium, iridium, cadmium, indium, hafnium, tantalum, platinum, neodymium, gallium, zinc, and a combination thereof.

36. The particulate composition of claim 33, wherein:
a) the polymer is selected from the group consisting of polyethylene glycol, sorbitol, manitol, starch, dextran, poly methyl methacrylate, polyaniline, polystyrene, poly pyrolle, N-isopropyl acrylamide, acrylamide, lecithin, and a combination thereof.

37. The particulate composition of claim 33, wherein:
a) the ceramic material is selected from the group consisting of iron oxide, zinc ferrite, manganese ferrite, zinc oxide, aluminum oxide, silicon dioxide, silicon carbide, boron carbide, carbon, indium oxide, titania, aluminum nitride, zirconia, tin oxide, chromium oxide, yttrium oxide, niobium oxide, hafnium oxide, tantalum oxide, tungsten oxide, magnesium oxide, boron nitride, silicon nitride, hafnium nitride, tantalum nitride, tungsten nitride, iron nitride, vanadium nitride, titanium, silicon carbide, chromium carbide, vanadium carbide, titanium carbide, iron carbide, zirconium carbide, niobium carbide, hafnium carbide, tungsten carbide, tantalum carbide, titanium diboride, vanadium boride, iron boride, zirconium diboride, hafnium diboride, tantalum diboride, nickel boride, cobalt boride, chromium boride, and a combination thereof.

38. The particulate composition of claim 33, wherein:
a) the intermetallic material is selected from the group consisting of titanium aluminide, niobium aluminide, iron aluminide, nickel aluminide, ruthenium aluminide, iridium aluminide, chromium aluminide, titanium silicide, niobium silicide, zirconium silicide, molybdenum silicide, hafnium silicide, tantalum silicide, tungsten silicide, iron silicide, cobalt silicide, nickel silicide, magnesium silicide, yttrium silicide, cadmium silicide, berryllium oxide, nickel berryllide, niobium berryllide, tantalum berryllide, yttrium berryllide, tantalum berryllide, zirconium berryllide, and a combination thereof.

39. The particulate composition of claim 33, wherein:
a) the alloy is selected from the group consisting of ferro-nickel, ferro-silicon, ferro-manganese, ferro-magnesium, brass, bronze, steel, and a combination thereof.

40. The particulate composition of claim 22, wherein:
a) said core particles with said one or more coatings selectively interact with one or more of an external stimulus selected from the group consisting of an electric field, a magnetic field, a thermal field, an optical field, and a combination thereof.

41. The particulate composition of claim 40, wherein:
a) said core particles interact with one or more of said external stimulus individually or simultaneously.

42. The composition of claim 22, wherein:
a) said fluid is selected from the group consisting of water, a water and oil mixture, oil, wax, a lubricant, a metallic fluid, a polymer, an organic solvent, and a combination thereof.

43. The particulate composition of claim 22, further comprising:
a) a dispersant.

44. The particulate composition of claim 43, wherein:
a) said dispersant is selected from the group consisting of polyethylene glycol, glycerol, sorbitol, manitol, dextran, starch, lecithin, and a combination thereof.

45. A particle for delivery of an agent to a desired location in a system, comprising:
a) a magneto-responsive core for assisting in transport of the particle to a desired location in a system;
b) said core including a coating of a fluorescent material for tracking the movement of the particle in the system;
c) said core including another permanent coating of a surfactant wherein the core and/or at least one of said coatings provides the particle with at least one property selected from the group consisting of magnetic, thermal, optical, electrical, biological, chemical, lubrication, rheological, and a combination thereof; and
d) said fluorescent material comprising gold, silver, or a combination thereof.

46. The particle of claim 45, wherein:
a) said core has a size of about 1 nm to 500 µm.

47. The particle of claim 46, wherein:
a) said core comprises a general shape selected from the group consisting of a sphere, a needle, a cube, an oval, irregular, a cylinder, a diamond, a lamella, a polyhedron, and a combination thereof.

48. The particle of claim 47, further comprising:
a) a dispersant selected from the group consisting of oleic acid, lecithin, polyethylene glycol, starch, glycerol, sorbitol, manitol, and a combination thereof.

49. The particle of claim 45, wherein:
a) said core comprises a member selected from the group consisting of iron, iron oxide, a ferrite, cobalt, nickel, and a combination thereof.

50. The particle of claim 49, wherein:
a) the agent comprises a biological, a pharmaceutical, or a chemical agent, or a combination thereof.

51. A magneto-responsive particulate material, comprising:
a) a predetermined amount of a magnetic particulate material;
b) said particulate material comprising core particles with a chemical or biological antagonist material; and
c) said core particles comprising a permanent coating of a surfactant wherein the core particles and/or said coating provides said particulate material with at least one property selected from the group consisting of magnetic, thermal, optical, electrical, biological, chemical, lubrication, rheological, and a combination thereof.

52. The particulate material of claim 51, wherein:
a) said biological material is antagonist to a molecule selected from the group consisting of a toxin, pathogen, DNA, RNA, protein, a biochemical, and a combination thereof.

53. The particulate material of claim 51, wherein:
a) said core particles are selected from the group consisting of iron, iron oxide, and a combination thereof.

54. The particulate material of claim 51, wherein:
a) said core particles comprise super-paramagnetic particles.

55. The particulate material of claim 53, wherein:
a) said core particles have an average particle size of about 1 nm to 500 µm.

56. The particulate material of claim 55, wherein:
a) said core particles comprise a general shape selected from the group consisting of a sphere, a needle, a cube, an oval, irregular, a cylinder, a diamond, a lamella, a polyhedron, and a combination thereof.

57. The particulate material of claim 56, further comprising:
a) a dispersant selected from the group consisting of polyethylene glycol, starch, dextran, and a combination thereof.

58. The particulate material of claim 2, wherein:
a) the alloy comprises one or more metals selected from the group consisting of copper, cobalt, nickel, aluminum, iron, tin, gold, silver, chromium, molybdenum, tungsten, zinc, silicon, magnesium, titanium, vanadium, magnesium, germanium, zirconium, niobium, rhenium, iridium, cadmium, indium, hafnium, tantalum, platinum, neodymium, gallium, zinc, an alloy, an oxide, and a combination thereof.

59. The particulate material of clam 12, wherein:
a) the alloy comprises one or more metals selected from the group consisting of copper, cobalt, nickel, aluminum, iron, tin, gold, silver, chromium, molybdenum, tungsten, zinc, silicon, magnesium, titanium, vanadium, magnesium, germanium, zirconium, niobium, rhenium, iridium, cadmium, indium, hafnium, tantalum, platinum, neodymium, gallium, zinc, an alloy, an oxide, and a combination thereof.

60. The particulate composition of claim 23, wherein:
a) the alloy comprises one or more metals selected from the group consisting of copper, cobalt, nickel, aluminum, iron, tin, gold, silver, chromium, molybdenum, tungsten, zinc, silicon, magnesium, titanium, vanadium, magnesium, germanium, zirconium, niobium, rhenium, iridium, cadmium, indium, hafnium, tantalum, platinum, neodymium, gallium, zinc, an alloy, an oxide, and a combination thereof.

61. The particulate composition of claim 33, wherein:
a) the alloy comprises one or more metals selected from the group consisting of copper, cobalt, nickel, aluminum, iron, tin, gold, silver, chromium, molybdenum, tungsten, zinc, silicon, magnesium, titanium, vanadium, magnesium, germanium, zirconium, niobium, rhenium, iridium, cadmium, indium, hafnium, tantalum, platinum, neodymium, gallium, zinc, an alloy, an oxide, and a combination thereof.

* * * * *